(12) United States Patent
Yoshimi et al.

(10) Patent No.: US 11,150,503 B2
(45) Date of Patent: Oct. 19, 2021

(54) LIQUID CRYSTAL DISPLAY DEVICE

(71) Applicant: ZEON CORPORATION, Tokyo (JP)

(72) Inventors: Hiroyuki Yoshimi, Tokyo (JP);
Shunsuke Yamanaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/060,112

(22) PCT Filed: Dec. 14, 2016

(86) PCT No.: PCT/JP2016/087284
§ 371 (c)(1),
(2) Date: Jun. 7, 2018

(87) PCT Pub. No.: WO2017/104720
PCT Pub. Date: Jun. 22, 2017

(65) Prior Publication Data
US 2018/0348568 A1    Dec. 6, 2018

(30) Foreign Application Priority Data

Dec. 17, 2015  (JP) .................................. 2015-246426
Dec. 17, 2015  (JP) .............................. JP2015-246425

(51) Int. Cl.
*G02F 1/1335*   (2006.01)
*G02B 5/30*     (2006.01)
*G02F 1/13363*  (2006.01)

(52) U.S. Cl.
CPC ......... *G02F 1/133504* (2013.01); *G02B 5/30* (2013.01); *G02B 5/3083* (2013.01);
(Continued)

(58) Field of Classification Search
CPC ............... G02F 1/1335; G02F 1/13363; G02F 1/133504; G02F 1/133543;
(Continued)

(56) References Cited

U.S. PATENT DOCUMENTS 5,518,783 A    5/1996  Ken et al.
6,239,911 B1   5/2001  Toshihiro et al.
(Continued)

FOREIGN PATENT DOCUMENTS

CN    1950732 A     4/2007
CN    101382617 A   3/2009
(Continued)

OTHER PUBLICATIONS

Mar. 7, 2017, International Search Report issued in the International Patent Application No. PCT/JP2016/087284.
(Continued)

*Primary Examiner* — Charles S Chang
(74) *Attorney, Agent, or Firm* — Kenja IP Law PC

(57) ABSTRACT

A liquid crystal display device including, sequentially in the following order: a light source unit, a rear side polarizer, a liquid crystal cell, a front side polarizer, and a viewing angle expansion film. Alternatively, a liquid crystal display device including, sequentially in the following order: a light source unit, a rear side polarizer, a liquid crystal cell, a viewing angle expansion film, and a front side polarizer. The liquid crystal display device optionally includes a rear side optical film provided between the rear side polarizer and the liquid crystal cell; and a front side optical film provided between the front side polarizer and the liquid crystal cell.

15 Claims, 6 Drawing Sheets

(52) U.S. Cl.
CPC .. *G02F 1/133502* (2013.01); *G02F 1/133536* (2013.01); *G02F 1/133634* (2013.01); *G02F 1/133531* (2021.01); *G02F 1/133541* (2021.01); *G02F 1/133543* (2021.01); *G02F 1/133638* (2021.01); *G02F 2201/18* (2013.01); *G02F 2202/022* (2013.01); *G02F 2203/03* (2013.01); *G02F 2413/02* (2013.01)

(58) Field of Classification Search
CPC .......... G02F 1/133541; G02F 2201/18; G02F 2202/022; G02F 2203/03; G02F 1/133502; G02F 1/133536; G02F 1/133634; G02F 1/133531; G02F 1/133638; G02F 2413/02; G02B 5/30; G02B 5/3083
USPC .................................................. 349/117–119
See application file for complete search history.

(56) References Cited

U.S. PATENT DOCUMENTS

| | | | |
|---|---|---|---|
| 7,135,211 | B2 | 11/2006 | Shunsuke et al. |
| 8,097,200 | B2 | 1/2012 | Takeshi |
| 8,270,076 | B2 | 9/2012 | Taku et al. |
| 8,953,118 | B2 | 2/2015 | Akinori et al. |
| 2005/0001957 | A1* | 1/2005 | Amimori ............. G02B 5/0252 349/112 |
| 2007/0054066 | A1 | 3/2007 | Usukura et al. |
| 2007/0285599 | A1 | 12/2007 | Oxude |
| 2008/0220214 | A1 | 9/2008 | Uozu et al. |
| 2008/0303995 | A1 | 12/2008 | Shimodaira et al. |
| 2010/0175820 | A1 | 7/2010 | Uozu et al. |
| 2012/0176573 | A1 | 7/2012 | Katsuaki et al. |
| 2013/0039094 | A1* | 2/2013 | Kolb ...................... G02B 1/04 362/618 |
| 2016/0085114 | A1* | 3/2016 | Oka .................. G02F 1/133504 349/98 |
| 2017/0115524 | A1* | 4/2017 | Ochi ...................... B32B 23/08 |

FOREIGN PATENT DOCUMENTS

| | | |
|---|---|---|
| CN | 102597818 A | 7/2012 |
| CN | 103080782 A | 5/2013 |
| JP | H0682607 A | 3/1994 |
| JP | H07146403 A | 6/1995 |
| JP | H07281028 A | 10/1995 |
| JP | H0980233 A | 3/1997 |
| JP | H09166702 A | 6/1997 |
| JP | H09281306 A | 10/1997 |
| JP | H10206836 A | 8/1998 |
| JP | 2000075137 A | 3/2000 |
| JP | 2002174725 A | 6/2002 |
| JP | 2003149441 A | 5/2003 |
| JP | 2003287623 A | 10/2003 |
| JP | 2003287750 A | 10/2003 |
| JP | 2003342384 A | 12/2003 |
| JP | 2004341494 A | 12/2004 |
| JP | 2005043740 A | 2/2005 |
| JP | 2005097621 A | 4/2005 |
| JP | 2005120352 A | 5/2005 |
| JP | 2005352404 A | 12/2005 |
| JP | 2006235085 A | 9/2006 |
| JP | 2006313262 A | 11/2006 |
| JP | 2009223163 A | 10/2009 |
| JP | 2009298100 A | 12/2009 |
| JP | 2011076026 A | 4/2011 |
| JP | 2011107688 A | 6/2011 |
| JP | 2011133878 A | 7/2011 |
| JP | 2012167159 A | 9/2012 |
| JP | 2014142672 A | 8/2014 |
| WO | 2005050269 A1 | 6/2005 |
| WO | 2006035635 A1 | 4/2006 |
| WO | 2006054695 A1 | 5/2006 |
| WO | 2007046467 A1 | 4/2007 |
| WO | 2009041273 A1 | 4/2009 |

OTHER PUBLICATIONS

Shinsuke Toyomasu et al.,Development of Negative Birefringence Polymeric Material for Novel Wide Viewing Angle Retardation Films., TOSOH Research & Technology Review, 2004, pp. 23-29, vol. 48.

Jun. 19, 2018, International Preliminary Report on Patentability issued in the International Patent Application No. PCT/JP2016/087284.

* cited by examiner

LIQUID CRYSTAL DISPLAY DEVICE

FIELD

The present invention relates to a liquid crystal display device.

BACKGROUND

Liquid crystal display devices are classified into those of various modes depending on the scheme for driving the liquid crystal cells. Examples of the modes of the liquid crystal cells may include the VA (Vertical Alignment) mode, the IPS (In-Plane Switching) mode, and the TN (Twisted Nematic) mode.

In many cases, these liquid crystal display devices have a basic structure that includes a light source, a polarizer on a rear side (closer to the light source), a liquid crystal cell, and a polarizer on a front side (farther from the light source). It is also known that in addition to this basic structure, various types of components are provided in order to improve the performance of display (for example, Patent Literatures 1 to 2).

CITATION LIST

Patent Literature

Patent Literature 1: International Publication No. 2006/54695
Patent Literature 2: International Publication No. 2006/35635 (corresponding foreign publication: specification of US patent No. 2007/285599)

SUMMARY

Technical Problem

There is a demand for further improvement in image quality of the liquid crystal display device. For example, there is a demand for improving the image quality on the display surface when the display surface is viewed at an oblique angle such as a polar angle (an angle relative to the normal direction to the display surface) of 45°. There is also a demand for improving the image quality on the display surface in the case of viewing at such oblique angles at various azimuth angles. There is also a demand for improving the contrast of display. More specifically, in addition to the dark place contrast ratio that is a contrast ratio given when the display surface is observed in a dark ambient environment, there is a demand for improving the bright place contrast ratio that is a contrast ratio given when the display surface is observed in a bright ambient environment.

Therefor, it is an object of the present invention to provide a liquid crystal display device which is capable, in combinations with liquid crystal cells of various modes, of improving visibility in oblique directions at various azimuth angles and improving the contrast ratio.

Solution to Problem

As a result of studies aiming at solving the aforementioned problems, the inventor has found that the aforementioned problems can be solved by providing a viewing angle expansion film at a particular position of the liquid crystal display device. Thus, the present invention has been completed.

That is, the present invention is as follows.

[A1] A liquid crystal display device comprising, sequentially in the following order:
a light source unit, a rear side polarizer, a liquid crystal cell, a front side polarizer, and
a viewing angle expansion film.

[A2] The liquid crystal display device according to [A1], further comprising:
a rear side optical film provided between the rear side polarizer and the liquid crystal cell; and
a front side optical film provided between the front side polarizer and the liquid crystal cell, wherein
the rear side polarizer and the rear side optical film constitute a rear side circularly polarizing plate, and
the front side polarizer and the front side optical film constitute a front side circularly polarizing plate.

[A3] The liquid crystal display device according to [A2], wherein the rear side optical film, the front side optical film or both thereof are a λ/4 plate.

[A4] The liquid crystal display device according to [A3], wherein an angle of intersection between an absorption axis of the rear side polarizer and a slow axis of the rear side optical film, an angle of intersection between an absorption axis of the front side polarizer and a slow axis of the front side optical film, or both of these angles are 45°.

[A5] The liquid crystal display device according to any one of [A2] to [A4], wherein the rear side optical film, the front side optical film or each of these consists of a plurality of layers.

[A6] The liquid crystal display device according to any one of [A1] to [A5], wherein the liquid crystal cell is a VA mode liquid crystal cell.

[A7] The liquid crystal display device according to any one of [A2] to [A6], wherein an Nz factor of the rear side optical film, of the front side optical film, or of both of these films are such that Nz≥1.3.

[A8] The liquid crystal display device according to any one of [A2] to [A7], wherein a variation of an in-plane retardation Re of the rear side optical film, of the front side optical film, or of both of these films are within a range of 1 nm or more and 10 nm or less.

[A9] The liquid crystal display device according to any one of [A2] to [A8], wherein a variation of a slow axis of the rear side optical film, of the front side optical film, or of both of these films are within a range of 0.1° or more and 2.0° or less.

[A10] The liquid crystal display device according to any one of [A2] to [A9], wherein a variation of an angle of intersection between the rear side optical film and the rear side polarizer, of an angle of intersection between the front side optical film and the front side polarizer, or of both of these angles are within the range of 0.2° or more and 2.0° or less.

[A11] The liquid crystal display device according to [A1], wherein the liquid crystal cell is an IPS mode liquid crystal cell.

[A12] The liquid crystal display device according to any one of [A1] to [A11], including a display surface of a rectangular shape, wherein
an absorption axis of the rear side polarizer or the front side polarizer is in a direction parallel or perpendicular to one edge of the display surface.

[A13] The liquid crystal display device according to any one of [A1] to [A12], wherein the liquid crystal cell is a normally black mode liquid crystal cell.

[A14] The liquid crystal display device according to [A1], wherein the liquid crystal cell is a TN mode liquid crystal cell.

[A15] The liquid crystal display device according to [A14], including a display surface of a rectangular shape, wherein
an absorption axis of the rear side polarizer or the front side polarizer is in a direction at about 45° or about 135° relative to one edge of the display surface.

[A16] The liquid crystal display device according to [A14] or [A15], wherein the liquid crystal cell is a normally white mode liquid crystal cell.

[A17] The liquid crystal display device according to any one of [A1] to [A16], wherein the viewing angle expansion film has a hole-containing portion.

[A18] The liquid crystal display device according to [A17], wherein the viewing angle expansion film includes, as the hole-containing portion, a plurality of hole-containing portions that are approximately parallel to each other.

[A19] The liquid crystal display device according to [A17] or [A18], wherein the viewing angle expansion film includes two or more resin layers, and the hole-containing portion is provided on one or more of the resin layers.

[A20] The liquid crystal display device according to any one of [A17] to [A19], wherein the viewing angle expansion film consists of a multi-layered film including a core layer, and has a craze, as the hole-containing portion, in the core layer.

[A21] The liquid crystal display device according to any one of [A17] to [A20], wherein in the viewing angle expansion film, adjacent ones of the hole-containing portions are disposed at random intervals of 50 μm or less, and the hole-containing portion has a width of 20 nm or more.

[A22] The liquid crystal display device according to any one of [A1] to [A21], further comprising a hard coat layer on a front side surface of the viewing angle expansion film.

[A23] The liquid crystal display device according to any one of [A1] to [A22], further comprising an adhesion facilitating layer on a rear side surface of the viewing angle expansion film.

[A24] The liquid crystal display device according to any one of [A1] to [A23], wherein the viewing angle expansion film has an ultraviolet absorption function.

[A25] The liquid crystal display device according to [A24], wherein the viewing angle expansion film consists of a multi-layered film having an ultraviolet absorber.

[A26] The liquid crystal display device according to any one of [A1] to [A25], wherein the viewing angle expansion film protects the front side surface of the front side polarizer.

[A27] The liquid crystal display device according to any one of [A1] to [A26], wherein the viewing angle expansion film is a stretched film.

[A28] The liquid crystal display device according to any one of [A1] to [A27], wherein the light source unit is a light source that emits linearly polarized light.

[B1] A liquid crystal display device comprising, sequentially in the following order:
a light source unit, a rear side polarizer, a liquid crystal cell, a viewing angle expansion film, and a front side polarizer.

[B2] The liquid crystal display device according to [B1], further comprising:
a rear side optical film provided between the rear side polarizer and the liquid crystal cell; and
a front side optical film provided between the front side polarizer and the viewing angle expansion film, wherein the rear side polarizer and the rear side optical film constitute a rear side circularly polarizing plate, and the front side polarizer and the front side optical film constitute a front side circularly polarizing plate.

[B3] The liquid crystal display device according to [B2], wherein the rear side optical film, the front side optical film, or both thereof are a λ/4 plate.

[B4] The liquid crystal display device according to [B3], wherein an angle of intersection between an absorption axis of the rear side polarizer and a slow axis of the rear side optical film, an angle of intersection between an absorption axis of the front side polarizer and a slow axis of the front side optical film, or both of these angles are 45°.

[B5] The liquid crystal display device according to any one of [B2] to [B4], wherein the rear side optical film, the front side optical film, or each of these consists of a plurality of layers.

[B6] The liquid crystal display device according to any one of [B1] to [B5], wherein the liquid crystal cell is a VA mode liquid crystal cell.

[B7] The liquid crystal display device according to any one of [B2] to [B6], wherein an Nz factor of the rear side optical film, of the front side optical film, or of both of these films is such that Nz≥1.3.

[B8] The liquid crystal display device according to any one of [B2] to [B7], wherein a variation of an in-plane retardation Re of the rear side optical film, of the front side optical film, or of both of these films are within a range of 1 nm or more and 10 nm or less.

[B9] The liquid crystal display device according to any one of [B2] to [B8], wherein a variation of a slow axis of the rear side optical film, of the front side optical film, or of both of these films are within a range of 0.1° or more and 2.0° or less.

[B10] The liquid crystal display device according to any one of [B2] to [B9], wherein a variation of an angle of intersection between the rear side optical film and the rear side polarizer, of an angle of intersection between the front side optical film and the front side polarizer, or of both of these angles are within a range of 0.2° or more and 2.0° or less.

[B11] The liquid crystal display device according to [B1], wherein the liquid crystal cell is an IPS mode liquid crystal cell.

[B12] The liquid crystal display device according to any one of [B1] to [B11], including a display surface of a rectangular shape, wherein
an absorption axis of the rear side polarizer or the front side polarizer is in a direction parallel or perpendicular to one edge of the display surface.

[B13] The liquid crystal display device according to any one of [B1] to [B12], wherein the liquid crystal cell is a normally black mode liquid crystal cell.

[B14] The liquid crystal display device according to [B1], wherein the liquid crystal cell is a TN mode liquid crystal cell.

[B15] The liquid crystal display device according to [B14], including a display surface of a rectangular shape, wherein
an absorption axis of the rear side polarizer or the front side polarizer is in a direction at about 45° or about 135° relative to one edge of the display surface.

[B16] The liquid crystal display device according to [B14] or [B15], wherein the liquid crystal cell is a normally white mode liquid crystal cell.

[B17] The liquid crystal display device according to any one of [B1] to [B16], wherein the viewing angle expansion film is isotropic.

[B18] The liquid crystal display device according to [B17], wherein the in-plane retardation Re of the viewing angle expansion film is such that Re≤5 nm, and a thickness direction retardation Rth is such that |Rth|≤10 nm.

[B19] The liquid crystal display device according to any one of [B1] to [B18], wherein the viewing angle expansion film has a hole-containing portion.

[B20] The liquid crystal display device according to [B19], wherein the viewing angle expansion film includes, as the hole-containing portion, a plurality of hole-containing portions that are approximately parallel to each other.

[B21] The liquid crystal display device according to [B19] or [B20], wherein the viewing angle expansion film includes two or more resin layers, and the hole-containing portion is provided on one or more of the resin layers.

[B22] The liquid crystal display device according to any one of [B19] to [B21], wherein the viewing angle expansion film consists of a multi-layered film including a core layer and has a craze, as the hole-containing portion, in the core layer.

[B23] The liquid crystal display device according to any one of [B19] to [B22], wherein in the viewing angle expansion film, adjacent ones of the hole-containing portions are disposed at random intervals of 50 μm or less, and the hole-containing portion has a width of 20 nm or more.

[B24] The liquid crystal display device according to any one of [B1] to [B23], further comprising an adhesion facilitating layer on a rear side surface of the viewing angle expansion film.

[B25] The liquid crystal display device according to any one of [B1] to [B24], wherein the viewing angle expansion film has an ultraviolet absorption function.

[B26] The liquid crystal display device according to [B25], wherein the viewing angle expansion film consists of a multi-layered film having an ultraviolet absorber.

[B27] The liquid crystal display device according to any one of [B1] to [B26], wherein the viewing angle expansion film protects a front side surface of the front side polarizer.

[B28] The liquid crystal display device according to any one of [B1] to [B27], wherein the viewing angle expansion film is an unstretched film.

[B29] The liquid crystal display device according to any one of [B1] to [B28], wherein the viewing angle expansion film is formed by an extrusion molding method.

[B30] The liquid crystal display device according to any one of [B1] to [B29], wherein the light source unit is a light source that emits linearly polarized light.

Advantageous Effects of Invention

The liquid crystal display device according to the present invention can have, in combinations with liquid crystal cells of various modes, an improved visibility in oblique directions at various azimuth angles and an improved contrast ratio.

DESCRIPTION OF EMBODIMENTS

Figure 1:
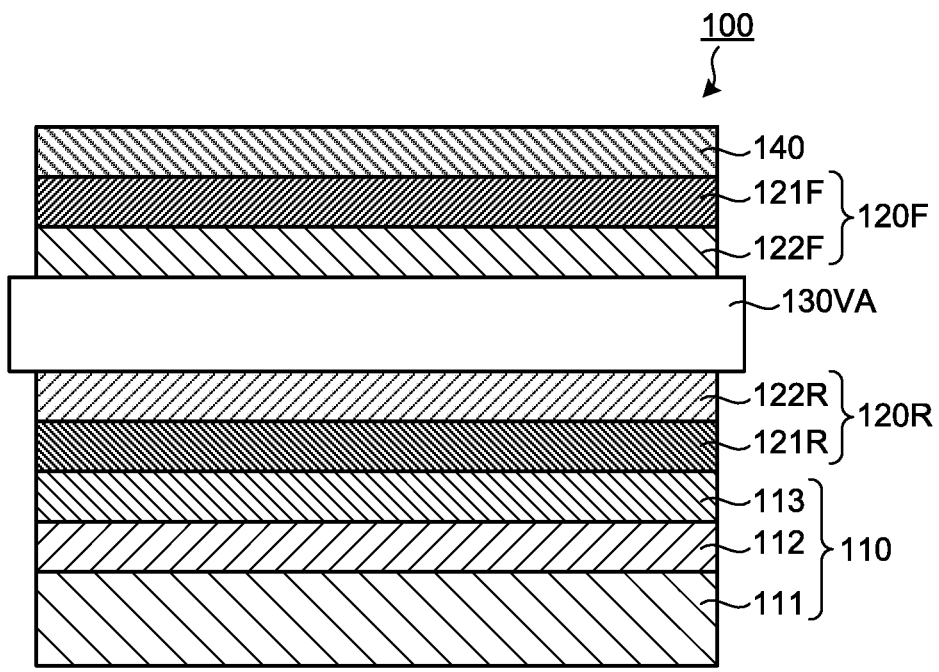
FIG. 1 is a cross-sectional view schematically illustrating an example of a liquid crystal display device according to the present invention.

Hereinafter, the present invention will be described in detail with reference to embodiments and examples. However, the present invention is not limited to the following embodiments and examples, and may be freely modified and practiced without departing from the scope of claims of the present invention and the scope of their equivalents.

In the following description, the term "polarizing plate" encompasses not only a rigid member but also a flexible member such as a resin film.

Further, a direction of an element that is "0°", "15°", "45°", "75°", "90°", "parallel", "perpendicular" or "orthogonal" may include an error within a range that does not impair the effects of the present invention, for example, usually within a range of ±5°, preferably ±2°, and more preferably ±1°, unless otherwise specified.

When it is contextually obvious in the present application, the "normal direction" means a normal direction relative to the display surface of a liquid crystal display device, and specifically, refers to a direction of a polar angle of 0° relative to the display surface.

In the present application, between the device display surface and the light source in the liquid crystal display device, the side relatively closer to the light source may be simply referred to as "the rear side", and the side closer to the display surface may be simply referred to as "the front side".

In the present application, an in-plane retardation Re of a film refers to a value represented by Re=(nx−ny)×d, unless otherwise specified, and a thickness-direction retardation Rth of a film refers to a value represented by Rth={(nx+ny)/2−nz}×d, unless otherwise specified. An Nz factor Nz of a film refers to a value represented by "Nz=(nx−nz)/(nx−ny)". Herein, nx represents a refractive index in a direction that gives, among directions perpendicular to the thickness direction of the film (in-plane directions), the maximum refractive index. ny represents a refractive index in a direction among the in-plane directions that is perpendicular to the direction of nx. nz refers to a refractive index in the thickness direction. d represents a thickness of the film. The measurement wavelength of a retardation is 590 nm and the temperature during measurement is 23° C., unless otherwise specified.

In the present application, the term "bright place contrast ratio" is a contrast ratio measured under the conditions wherein the illuminance of the light with which the display surface of the device is irradiated is 400 lux, whereas the term "dark place contrast ratio" is a contrast ratio measured under the conditions wherein the illuminance of the light with which the display surface of the device is irradiated is 0 lux.

In the present application, the "long-length" film refers to a film having its length being 5 or more times longer than the width, and preferably a film having the length being 10 or more times longer than the width. Specifically, the "long-length" film refers to a film long enough to be wound up into a rolled form and stored or transported. The upper limit of the length of the long-length film is not particularly limited, but is, for example, 100,000 or less times relative to the width.

In the present application, the MD direction (machine direction) is the flow direction of a film in a manufacturing line, while the TD direction (the traverse direction) is parallel to the film surface and perpendicular to the MD direction. Furthermore, for the sake of convenience, the lengthwise direction of a long-length film may also be referred to as the MD direction of the film, while the width direction may also be referred to as the TD direction of the film.

1. Summary

In an aspect, a liquid crystal display device according to the present invention includes, sequentially in the following order, a light source unit, a rear side polarizer, a liquid crystal cell, a front side polarizer, and a viewing angle expansion film. In another aspect, a liquid crystal display device according to the present invention includes, sequentially in the following order, a light source unit, a rear side polarizer, a liquid crystal cell, a viewing angle expansion film, and a front side polarizer. In the following descriptions, the former of the liquid crystal display devices according to the present invention may be referred to as a liquid crystal display device A and the latter as a liquid crystal display device B.

Optionally, the liquid crystal display device A according to the present invention may further include a rear side optical film provided between the rear side polarizer and the liquid crystal cell, and a front side optical film provided between the front side polarizer and the liquid crystal cell.

Optionally, the liquid crystal display device B according to the present invention may further include a rear side optical film provided between the rear side polarizer and the liquid crystal cell, and a front side optical film provided between the front side polarizer and the viewing angle expansion film.

2. First Embodiment: VA Mode Cell (First)

FIG. 1 is a cross-sectional view schematically illustrating an example of the liquid crystal display device A according to the present invention. In FIG. 1, a liquid crystal display device 100 includes, sequentially in the following order, a light source 111, a rear side polarizer 121R, a liquid crystal cell 130VA, a front side polarizer 121F, and a viewing angle expansion film 140. In this example, the liquid crystal cell 130VA is a VA mode liquid crystal cell. The VA mode liquid crystal cell may adopt any of the normally white mode and the normally black mode but may usually adopt the normally black mode.

Furthermore, the liquid crystal display device 100 further includes, as optional components, a rear side optical film 122R provided between the rear side polarizer 121R and the liquid crystal cell 130VA, and a front side optical film 122F provided between the front side polarizer 121F and the liquid crystal cell 130VA. In this example, the rear side polarizer 121R and the rear side optical film 122R constitute a rear side circularly polarizing plate 120R, and the front side polarizer 121F and the front side optical film 122F constitute a front side circularly polarizing plate 120F.

The liquid crystal display device 100 further includes, as optional components, a luminance enhancement film 112 and a collimating film 113 that are provided in combination with the light source 111. The light source 111, the luminance enhancement film 112, and the collimating film 113 constitute the light source unit 110.

2.1. Light Source Unit

In the light source unit 110, the luminance enhancement film 112 allows passing therethrough of only a polarized light component, which will then pass through the rear side polarizer 121R, of non-polarized light emitted from the light source 111 and reflects the other polarized light components. The light reflected on the luminance enhancement film 112 and returned toward the rear side may be further reflected on a member inside the light source 111 and then incident again in an altered polarized light state on the luminance enhancement film 112. This allows for increasing the amount of linearly polarized light that passes through the rear side polarizer 121R and reducing the amount of light absorbed by the rear side polarizer 121R. As a result, the luminance is improved. As the luminance enhancement film 112, various types of known luminance enhancement films may be adopted. Specific examples may include a film that has a circularly polarized light separation film and a λ/4 plate in combination.

Examples of the circularly polarized light separation film in the luminance enhancement film including the circularly polarized light separation film and the λ/4 plate may include a film obtained by forming a layer of a liquid crystal compound. More specific examples may include a film which includes a cholesteric resin layer, i.e., a liquid crystal cured product layer that is obtained by polymerizing a polymerizable compound that can exhibit a cholesteric liquid crystal phase while keeping the state of being oriented in the cholesteric liquid crystal phase. In the cholesteric resin layer, the molecules have a structure wherein the angle of a molecular axis is shifted (twisted) when observed across planes in which molecules are aligned in a constant direction, in a manner such that a molecular axis is aligned in a constant direction in one plane but the direction of a molecular axis is slightly shifted at an angle in the next plane, and the angle is further shifted in the subsequent plane.

The cholesteric resin layer has a circularly polarized light separation function. That is, the layer has a function of reflecting circularly polarized light of clockwise or counterclockwise rotation in a particular wavelength band and allowing passing therethrough of the other circularly polarized light. Thus, the film including the cholesteric resin layer serves as the circularly polarized light separation film. The cholesteric resin layer may preferably exhibit the circularly polarized light separation function across the entire wavelength region of visible light. More specifically, the cholesteric resin layer that has the circularly polarized light separation function for light in a wavelength region of 400 nm to 750 nm is preferable. For example, a cholesteric resin layer that has the circularly polarized light separation function for light of all wavelength band of blue (wavelengths 410 to 470 nm), green (wavelengths 520 to 580 nm), and red (wavelengths 600 to 660 nm) is preferable. It is possible to use, as such a cholesteric resin layer, those that are described in Japanese Patent Application Laid-Open No. 2014-142672 A.

The collimating film is a film that turns light having entered from the rear side thereof to a state of a nearly collimated beam of light, which is then emitted from the front side. In the example of FIG. 1, the collimating film 113 is a film that gathers beams of light, which have been emitted in a diffused manner from the light source 111, at an angle nearly equal to the normal direction. Such a gathering level may be represented by the luminance half-value angle of a collimated beam of light emitted from the collimating film 113. For example, as disclosed in Japanese Patent Application Laid-Open No. 2011-133878 A, the luminance half-value angle of a collimated beam of light is determined by measuring the luminance at an emission angle in a predetermined orientation within the emission plane when the collimated beam of light is emitted from a collimating film, measuring, on both the positive or negative sides, the emission angle at which the maximum luminance value is halved, and adding together the angles on both the sides. The luminance half-value angle of the collimated beam of light may be different depending on the orientation. Thus, for example, in the case of a liquid crystal display device that has a rectangular display surface and is used in an upright state, the indicator of the level of light gathering may be the average luminance half-value angle that is an average value of the luminance half-value angle in the vertical direction (in the up-and-down direction of the display surface) and the luminance half-value angle in the horizontal direction (in the right-and-left direction of the display surface). The average luminance half-value angle may be preferably 3° to 35°, more preferably 4° to 20°, and further more preferably 4° to 11°. Specific examples of the collimating film may include those that are listed in Japanese Patent Application Laid-Open No. 2011-133878 A. The contrast ratio of a liquid crystal cell can be easily improved when a greater amount of light is incident in the normal direction. Therefore, when the light having been turned to a collimated beam of light with the collimating film is emitted toward the front side, the contrast ratio of the liquid crystal display device can be improved. As the liquid crystal display device further includes the viewing angle expansion film, both a higher contrast ratio and a wider viewing angle can be achieved.

2.2. Polarizer And Optical Film

The absorption axis directions of the rear side polarizer 121R and the front side polarizer 121F may appropriately be set to a direction by which the function of the display device can be exhibited. In the case of the liquid crystal display device having a rectangular display surface, the absorption axis of the rear side polarizer or the front side polarizer is usually directed to be parallel or perpendicular to one edge of the display surface. Furthermore, the rear side polarizer 121R and the front side polarizer 121F are usually disposed so that the mutual absorption axes are parallel or orthogonal to each other when observed in the normal direction. For example, in the case of the liquid crystal display device having a rectangular display surface, the rear side polarizer 121R is disposed so that the absorption axis thereof is in a direction parallel to an edge of the display surface, and the front side polarizer 121F is disposed so that the absorption axis thereof is in a direction parallel or orthogonal to the absorption axis of the rear side polarizer 121R.

In the liquid crystal display device according to the present invention, any known material may appropriately be selected as the material constituting the polarizer. For example, a polarizer may be produced by allowing a polyvinyl alcohol film to adsorb iodine or a dichroic dye, and uniaxially stretching the film in a boric acid bath. Also, for example, a polarizer may be produced by allowing a polyvinyl alcohol film to adsorb iodine or a dichroic dye and stretching the film, and further modifying part of the polyvinyl alcohol unit in the molecular chain into a polyvinylene unit. Furthermore, a polarizer having a function of separating polarized light into reflected light and transmission light may be used as a polarizer. Examples of such a polarizer may include a grid polarizer, a multi-layered polarizer, and a cholesteric liquid crystal polarizer. Among these, a polarizer containing a polyvinyl alcohol is preferable. The polarization degree of the polarizer is preferably 98% or higher, and more preferably 99% or higher. The average thickness of the polarizer is preferably 5 µm to 80 µm.

In the example illustrated in FIG. 1 where the liquid crystal cell 130VA is a VA mode cell, it is possible to adopt a film that has an in-plane retardation Re of 100 to 300 nm and an Nz factor of 1.0 to 2.5 as the rear side optical film 122R and the front side optical film 122F to be provided in combination with such a liquid crystal cell.

In particular, it is preferable that the rear side optical film 122R, the front side optical film 122F, or both thereof are λ/4 plates. Such an aspect is preferable in the case where the liquid crystal cell is a VA mode cell as in the example of the liquid crystal display device 100. More specifically, it is more preferable that both the rear side optical film and the front side optical film are λ/4 plates. The λ/4 plate is a film of which an in-plane retardation Re is 90 to 180 nm, and preferably 120 to 150 nm.

When both the rear side optical film and the front side optical film are a λ/4 plate, it is preferable that the angle of intersection between the absorption axis of the rear side polarizer and the slow axis of the rear side optical film, the angle of intersection between the absorption axis of the front side polarizer and the slow axis of the front side optical film, or both of these angles are 45°. In particular, it is preferable that both the angle of intersection between the absorption axis of the rear side polarizer and the slow axis of the rear side optical film and the angle of intersection between the absorption axis of the front side polarizer and the slow axis of the front side optical film are 45°. In this case, the angle of intersection between the slow axis of the rear side optical film and the slow axis of the front side optical film may be 0° or 90°. When the absorption axis of the rear side polarizer and the absorption axis of the front side polarizer are orthogonal to each other, it is particularly preferable that the angle of intersection between the slow axis of the rear side optical film and the slow axis of the front side optical film is 0°. When the absorption axis of the rear side polarizer and the absorption axis of the front side polarizer are parallel to each other, it is particularly preferable that the angle of intersection between the slow axis of the rear side optical film and the slow axis of the front side optical film is 90°.

In the liquid crystal display device according to the present invention, each of the rear side optical film and the front side optical film may consist of only one layer as in the aforementioned example but may also consist of a plurality of layers. For example, the optical film may consist of a plurality of layers, and the entire optical film consisting of the plurality of layers may be configured to function as a ¼ plate. Furthermore, for example, the optical film may consist of a plurality of layers, wherein a layer of the plurality of layers that is in contact with the polarizer is a protective film serving to protect the polarizer, and the rest of the layers exhibits optical functions.

Specific examples of the optical film consisting of a plurality of layers may include an aspect in which the optical film includes a ½ plate and a ¼ plate. The inclusion of the ½ plate and the ¼ plate in combination allows the entire optical film to function as a ¼ plate. More specific examples may include those in which the combination of the polarizer and the optical film provides a layer configuration of (polarizer)/(½ plate)/(¼ plate). In this case, preferable examples of combinations of the slow axis directions of the ½ plate and the ¼ plate relative to the transmission axis of the polarizer may include the following:

Example (a)

Direction of the slow axis of the ½ plate relative to the transmission axis of the polarizer: 15°
Direction of the slow axis of the ¼ plate relative to the transmission axis of the polarizer: 75°

Example (b)

Direction of the slow axis of the ½ plate relative to the transmission axis of the polarizer: 75°
Direction of the slow axis of the ¼ plate relative to the transmission axis of the polarizer: 15°

Use of the optical film as in the example (a) or (b) facilitates configuring of an optical film that can function as a ¼ plate in a wide wavelength band and thus can readily achieve effects such as an improvement in visibility in a wide wavelength band. Furthermore, use of an optical film as in the example (a) or (b) as the front side optical film can achieve expression of the function of preventing reflection of ambient light on the display surface.

Another specific example of the optical film consisting of a plurality of layers may include an aspect in which the optical film includes a protective film and a phase difference film. In this case, a layer of the optical film in contact with the polarizer is the protective film, and a layer closer to the liquid crystal cell is the phase difference film. In this case, specifically, the phase difference film may be the same as the aforementioned ¼ plate or the aforementioned combination of the ½ plate and the ¼ plate. On the other hand, specifically, the protective film may be a layer substantially having an optical isotropy, and more specifically, may also be a first optical element to be discussed later.

As the material constituting the rear side optical film and the front side optical film in the liquid crystal display device according to the present invention, known materials may appropriately be selected and used. As examples thereof, various thermoplastic resins may be used. Examples of the thermoplastic resins may include polycarbonate, polyester, polyether sulfone, polyarylate, polyimide, and an alicyclic polyolefin resin. Among these, an alicyclic polyolefin is preferable, and in particular, from the viewpoint of mechanical strength, heat resistance, and the like, an alicyclic polyolefin resin having an alicyclic structure in a main chain thereof is preferable.

Examples of the alicyclic structure in the alicyclic polyolefin resin may include a saturated alicyclic hydrocarbon (cycloalkane) structure, and an unsaturated alicyclic hydrocarbon (cycloalkene) structure. From the viewpoint of mechanical strength, heat resistance, and the like, a cycloalkane structure is preferable. The number of carbon atoms constituting the alicyclic structure is not particularly limited, but is usually 4 to 30, preferably 5 to 20, and more preferably 5 to 15. When the number of carbon atoms fall within these ranges, mechanical strength, heat resistance, and film molding properties are obtained in a well-balanced manner, and these ranges are thus preferable.

The ratio of the repeating unit having an alicyclic structure constituting the alicyclic polyolefin resin is preferably 55% by weight or more, more preferably 70% by weight or more, and particularly preferably 90% by weight or more. The ratio of the repeating unit having an alicyclic structure in the alicyclic polyolefin resin that falls within this range is preferable from the viewpoint of transparency and heat resistance.

Examples of the alicyclic polyolefin resin may include a norbornene-based resin, a monocyclic olefin-based resin, a cyclic conjugated diene-based resin, a vinyl alicyclic hydrocarbon resin, and hydrogenated products of these. Among these, a norbornene-based resin is more preferable, because it has favorable transparency and molding properties.

Examples of the norbornene-based resin may include: a ring-opening polymer of a monomer having a norbornene structure, a ring-opening copolymer of a monomer having a norbornene structure and another monomer(s), and hydrogenated products of these; and an addition polymer of a monomer having a norbornene structure, an addition copolymer of a monomer having a norbornene structure and another monomer(s), and hydrogenated products of these. Among these, the hydrogenated product of the ring-opening (co)polymer of a monomer having a norbornene structure is particularly suitably used, from the viewpoint of transparency, molding properties, heat resistance, low hygroscopicity, size stability, lightweight properties, and the like.

Examples of the monomer having a norbornene structure may include bicyclo[2.2.1]hept-2-ene (common name: norbornene), tricyclo[4.3.0.1$^{2,5}$]dec-3,7-diene (common name: dicyclopentadiene), 7,8-benzotricyclo[4.3.0.1$^{2,5}$]dec-3-ene (common name: methanotetrahydrofluorene), tetracyclo [4.4.0.1$^{2,5}$.1$^{7,10}$]dodeca-3-ene (common name: tetracyclododecene), and derivatives of these compounds (for example, a derivative having a substituent on the ring). Here, examples of the substituent may include an alkyl group, an alkylene group, and a polar group. These substituents may be the same as or different from each other, and a plurality of substituents may be bonded on the ring. As the monomer having a norbornene structure, one type thereof may be solely used, and two or more types thereof may also be used in combination at any ratio.

Examples of the polar group may include a hetero atom, and an atomic group having a hetero atom. Examples of the hetero atom may include an oxygen atom, a nitrogen atom, a sulfur atom, a silicon atom, and a halogen atom. Specific examples of the polar group may include a carboxyl group, a carbonyloxycarbonyl group, an epoxy group, a hydroxyl group, an oxy group, an ester group, a silanol group, a silyl group, an amino group, a nitrile group, and a sulfone group. In order to obtain a film having a small saturation water absorption rate, it is preferable to have the polar group in a smaller amount. It is more preferable to have no polar group.

Examples of the monomer which is ring-opening copolymerizable with the monomer having a norbornene structure may include monocyclic olefins such as cyclohexene, cycloheptene, cyclooctene, and derivatives thereof; and cyclic conjugated diene such as cyclohexadiene and cycloheptadiene, and derivatives thereof.

The ring-opening polymer of the monomer having a norbornene structure and the ring-opening copolymer of the monomer having a norbornene structure and another monomer copolymerizable therewith may be obtained by polymerization or copolymerization of the monomer(s) in the presence of a publicly known ring-opening polymerization catalyst.

Examples of the monomer which is addition-copolymerizable with the monomer having a norbornene structure may include α-olefin of 2 to 20 carbon atoms such as ethylene, propylene, and 1-butene, and derivatives of these; cycloolefin such as cyclobutene, cyclopentene and cyclohexene, and derivatives of these; and non-conjugated diene such as 1,4-hexadiene, 4-methyl-1,4-hexadiene, and 5-methyl-1,4-hexadiene. As the monomer, one type thereof may be solely used, and two or more types thereof may also be used in combination at any ratio. Of these, α-olefin is preferable, and ethylene is more preferable.

The addition polymer of the monomer having a norbornene structure and the addition copolymer of the monomer having a norbornene structure and another monomer copolymerizable therewith may be obtained by polymerization of the monomer(s) in the presence of a publicly known addition polymerization catalyst.

The hydrogenated product of the ring-opening polymer of the monomer having a norbornene structure, the hydrogenated product of the ring-opening copolymer of the monomer having a norbornene structure and another monomer ring-opening copolymerizable therewith, the hydrogenated product of the addition polymer of the monomer having a norbornene structure, and the hydrogenated product of the addition copolymer of the monomer having a norbornene structure and another monomer addition-copolymerizable therewith may be produced by adding a publicly known hydrogenation catalyst which contains transition metal such as nickel and palladium to a solution of the ring-opening (co)polymer or addition (co)polymer, and bringing the solution into contact with hydrogen to hydrogenate preferably 90% or more of unsaturated carbon-carbon bonds therein.

Of the norbornene-based resins, a norbornene-based resin that has as its repeating units X: bicyclo[3.3.0]octane-2,4-diyl-ethylene structure and Y:tricyclo[4.3.0.1$^{2,5}$]decane-7,9-diyl-ethylene structure, and in which the contents of these repeating units are 90% by weight or more relative to the entirety of the repeating units in the norbornene-based resin and a ratio of the content percentage of X and the content percentage of Y in terms of the weight ratio X:Y is 100:0 to 40:60 is preferable. Use of such a resin can afford an optical film which does not cause long-term size change and has excellent stability of optical properties.

The molecular weight of the alicyclic polyolefin resin suitably used in the present invention is appropriately selected depending on its purpose of use. The weight-average molecular weight (Mw) of the alicyclic polyolefin resin is preferably 15,000 to 50,000, more preferably 18,000 to 45,000, and particularly preferably 20,000 to 40,000. Here, the weight-average molecular weight (Mw) is measured as a polyisoprene-equivalent (if the solvent is toluene, polystyrene-equivalent) value by gel permeation chromatography with cyclohexane (if the resin is not dissolved in cyclohexane, with toluene) used as a solvent. The weight-average molecular weight that falls within such a range is preferable, because mechanical strength and molding properties of the film can be highly balanced.

The molecular weight distribution (weight-average molecular weight (Mw)/number-average molecular weight (Mn)) of the alicyclic polyolefin resin suitably used in the present invention is not particularly limited, but is usually in a range of 1.0 to 10.0, preferably in a range of 1.1 to 4.0, and more preferably in a range of 1.2 to 3.5.

The glass transition temperature of the thermoplastic resin is appropriately selected depending on its purpose of use, but is preferably 80° C. or higher, and more preferably in a range of 100 to 250° C. In the film formed of the thermoplastic resin having the glass transition temperature that falls within such a range, deformation and stress generation under the high temperature environment can be prevented and excellent durability can be obtained.

The thermoplastic resin preferably has an absolute value of a photoelastic coefficient being preferably $10 \times 10^{-12}$ Pa$^{-1}$ or less, more preferably $7 \times 10^{-12}$ Pa$^{-1}$ or less, and particularly preferably $4 \times 10^{-12}$ Pa$^{-1}$ or less. A photoelastic coefficient C is a value obtained by dividing a birefringence Δn by a stress σ. That is, the photoelastic coefficient C is the value represented by C=Δn/σ. When the photoelastic coefficient of the thermoplastic resin exceeds $10 \times 10^{-12}$ Pa$^{-1}$, variation in the in-plane retardation of the stretched film may become large in some cases.

The thermoplastic resin may be molded into a long-length film by a publicly known method, for example, a cast molding method, an extrusion molding method, and an inflation molding method. The obtained film may be further stretched and cut to a desired shape to obtain an optical film having a desired phase difference and shape. Specific examples of the method for producing the optical film may include those described in Japanese Patent Application Laid-Open No. 2003-342384 a, and International Publication No. 2009/41273.

In the liquid crystal display device according to the present invention, one or more of the rear side optical film and the front side optical film preferably has an Nz factor of Nz≥1.3. Specifically, one or more of the Nz factors of the rear side optical film and the front side optical film is preferably 1.3 or more and 2.5 or less.

In the liquid crystal display device according to the present invention, one or more of the rear side optical film and the front side optical film preferably has a variation in the in-plane retardation Re in a range of 1 nm or more and 10 nm or less. Specifically, one or more of the Re variations of the rear side optical film and the front side optical film is preferably in a range of 2 nm or more and 5 nm or less.

In the liquid crystal display device according to the present invention, one or more of the rear side optical film and the front side optical film preferably has a variation in the slow axis in a range of 0.1° or more and 2.0° or less. Specifically, one or more of the slow axis variations of the rear side optical film and the front side optical film is preferably 0.3° or more and 1.0° or less.

In the liquid crystal display device according to the present invention, one or more of the angles of intersection between the rear side optical film and the rear side polarizer and between the front side optical film and the front side polarizer preferably has a variation in a range of 0.2° or more and 2.0° or less. Specifically, one or more of the variations in the angle of intersection between the rear side optical film and the front side optical film is preferably 0.8° or more and 2.0° or less.

A variation in the in-plane retardation Re, a variation in the slow axis, and a variation in the angle of intersection are the difference between the maximum value and the minimum value of the measurement results obtained at measurement points provided at intervals of 20 mm on a certain line parallel to a long edge direction of the display device on the display surface of the liquid crystal display device.

2.3. Viewing Angle Expansion Film

In the liquid crystal display device A according to the present invention, the viewing angle expansion film is provided on the front side relative to the front side polarizer. The viewing angle expansion film is a film that emits light, which has entered from the rear side, in a more diffused state through the front side. In the example of FIG. 1, the viewing angle expansion film emits light, which has been emitted from the front side optical film 122F, in a more diffused state from the front side.

2.4. Film Having Hole-Containing Portion Such as Craze Film

Preferable examples of the viewing angle expansion film may include a film having a hole-containing portion. More preferable examples may include a film having a craze. A description will now be given of such a viewing angle expansion film having a craze. In the following descriptions, the viewing angle expansion film having a craze may be referred to simply as a "craze film".

2.4.1. Material for Film Having Hole-Containing Portion

Materials for the film having a hole-containing portion such as the craze film may be a resin that includes various types of polymers. Examples of such polymers may include polystyrene, polypropylene, polyethylene, polyester, polyamide, polyvinylidene fluoride, poly(methyl methacrylate), and an alicyclic structure-containing polymer. From the viewpoint of facilitation in forming the craze, polystyrene, polypropylene, poly(methyl methacrylate) and an alicyclic structure-containing polymer are preferable.

Polystyrene is a polymer containing a repeating unit derived from a styrene-based monomer (hereinafter, appropriately referred to as a "styrene-based monomer unit"). The aforementioned styrene-based monomer refers to styrene and a styrene derivative. Examples of the styrene derivative may include α-methylstyrene, o-methylstyrene, p-methylstyrene, p-chlorostyrene, p-nitrostyrene, p-aminostyrene, p-carboxystyrene, and p-phenylstyrene. As the styrene-based monomer, one type thereof may be solely used, and two or more types thereof may also be used in combination at any ratio. Thus, the styrene-based polymer may contain one type of the styrene-based monomer unit alone, and may also contain two or more types thereof in combination at any ratio.

Polystyrene may be a homopolymer or a copolymer containing only the styrene-based monomer. Polystyrene may also be a copolymer of the styrene-based monomer and another monomer. Examples of the monomer copolymerizable with the styrene-based monomer may include ethylene, propylene, butadiene, isoprene, acrylonitrile, methacrylonitrile, α-chloroacrylonitrile, N-phenylmaleimide, methyl acrylate, methyl methacrylate, ethyl acrylate, ethyl methacrylate, maleic anhydride, acrylic acid, methacrylic acid, and vinyl acetate. As the monomer, one type thereof may be solely used, and two or more types thereof may also be used in combination at any ratio.

Polypropylene may be a homopolymer of propylene, and may also be a copolymer of propylene with a monomer other than propylene. When polypropylene is a copolymer, such polypropylene may be a random polymer, a block copolymer, or a graft polymer. Even when polypropylene is a copolymer, however, the content of the repeating unit that is derived from propylene that polypropylene contains is preferably high, and is specifically preferably 80% by weight or more, and more preferably 85% by weight or more.

Examples of the alicyclic structure-containing polymer may include (1) a norbornene-based polymer, (2) a monocyclic olefin-based polymer, (3) a cyclic conjugated diene-based polymer, (4) a vinyl alicyclic hydrocarbon polymer, and hydrogenated products of (1) to (4). Among these, a norbornene-based resin and a hydrogenated product thereof are preferable from the viewpoint of heat resistance, mechanical strength, and the like.

The weight-average molecular weight of the resin constituting the material for the film having a hole-containing portion as a polystyrene-equivalent weight-average molecular weight measured by gel permeation chromatography is usually 5,000 or more, preferably 10,000 or more, and more preferably 15,000 or more, and is usually 50,000 or less, preferably 45,000 or less, and more preferably 40,000 or less.

The resin constituting the film having a hole-containing portion may contain an optional component other than the polymer as necessary. Examples of the optional component may include an ultraviolet absorber, an antioxidant, a heat stabilizer, a light stabilizer, an antistatic agent, a dispersant, a chlorine scavenger, a flame retardant, a crystallization nucleating agent, a strengthening agent, an antiblocking agent, an antifogging agent, a mold release agent, a pigment, an organic or inorganic filler, a neutralizer, a lubricant, a decomposition agent, a metal deactivator, a fouling inhibitor, and an antimicrobial agent.

Examples of the ultraviolet absorber may include an oxybenzophenone-based compound, a benzotriazole-based compound, a salicylic acid ester-based compound, a benzophenone-based ultraviolet absorber, a benzotriazole-based ultraviolet absorber, an acrylonitrile-based ultraviolet absorber, a triazine-based compound, a nickel complex salt-based compound, and inorganic powder. Preferred examples of the ultraviolet absorber may include 2,2'-methylenebis(4-[1,1,3,3-tetramethylbutyl]-6-(2H-benzotriazol-2-yl)phenol), 2-(2'-hydroxy-3'-tert-butyl-5'-methylphenyl)-5-chlorobenzotriazole, 2,4-di-tert-butyl-6-(5-chlorobenzotriazol-2-yl)phenol, 2,2'-dihydroxy-4,4'-dimethoxybenzophenone, and 2,2',4,4'-tetrahydroxybenzophenone. Particularly preferable example may be 2,2'-methylenebis(4-[1,1,3,3-tetramethylbutyl]-6-(2H-benzotriazol-2-yl)phenol).

When the resin constituting the film having a hole-containing portion contains an ultraviolet absorber, the content of the ultraviolet absorber is preferably 0.5 to 5% by weight relative to 100% by weight of the resin.

The film having a hole-containing portion may consist of only one resin layer, and may alternatively include two or more resin layers. When the film having a hole-containing portion has two or more resin layers, materials constituting each resin layer to be used may be those illustrated in the foregoing. When the film having a hole-containing portion includes two or more resin layers, the hole-containing portion may be provided on the surface of one or more of the resin layers. In this case, the hole-containing portion may be provided on the outermost surface of the craze film, or on one or more interfaces between the plurality of resin layers inside the film having a hole-containing portion. For example, the viewing angle expansion film may consist of a multi-layered film including a core layer, and such a core layer may have a craze serving as a hole-containing portion. Such a craze film may be produced by a production method to be described later. When the film having a hole-containing portion includes two or more resin layers, respective resin layers may be the same resin layers, and may alternatively be different resin layers.

The thickness of the film having a hole-containing portion is preferably 5 μm or more, more preferably 10 μm or more, and further more preferably 20 μm or more. Although not limited to a particular value, the upper limit is preferably 100 μm or less, more preferably 70 μm or less, and further more preferably 40 μm or less. When the film having a hole-containing portion includes two or more resin layers, it is preferable that the total thickness of the resin layers falls within the aforementioned ranges.

The hole-containing portion of the viewing angle expansion film is a portion that includes a large number of holes on the film. Preferably, as the hole-containing portion, the viewing angle expansion film includes a plurality of hole-containing portions that are approximately parallel to each other.

Figure 5:
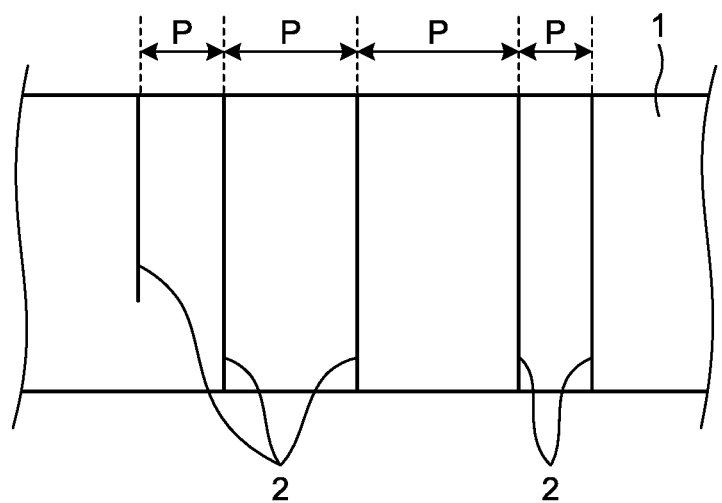
FIG. 5 is a plan view schematically illustrating an example of a craze film.

FIG. 5 is a plan view schematically illustrating an example of the craze film or a specific example of the film having a hole-containing portion. In the example of FIG. 5, a long-length craze film 1 includes on the surface thereof a plurality of straight crazes 2 which are parallel to each other. The crazes 2 each include a large number of holes (not shown in FIG. 5). In the example of FIG. 5, the lengthwise direction of the crazes 2 is parallel to the TD direction of the craze film 1.

Since the craze contains holes, light incident on the craze is scattered. Furthermore, by containing holes, the craze has a refractive index that is lower than the refractive index of a portion where no film craze is formed, and thus, regions having different refractive indices exist at the same time within the plane of the craze film. As a result, the angle of directions in which light is scattered can be expanded. Although not restricted to a particular theory, it is thought that scattering of light to such a broad range allows the viewing angle to be expanded.

Holes contained in a craze may or may not penetrate the layer having the craze in the thickness direction thereof. In any case, since the craze contains a hole, the craze has a structure with a depth in the thickness direction of the craze film. Each craze usually has a large number of holes. However, without being limited thereto, the structure of the craze may also consist of a single crack-shaped hole.

A plurality of crazes are provided to be approximately parallel to each other. The crazes being "approximately parallel to each other" may allow the angles that the crazes form with each other exceeding 0° within the range in which the effects of the present invention are available. More specifically, the angles may also include an error preferably within ±40°, and more preferably within ±30°. Since the crazes being "approximately parallel to each other" may have such an angular relationship, a plurality of crazes may also have mutually intersecting portions in the craze film.

Usually, individual crazes have an approximately linear shape. The craze having an "approximately linear" shape encompasses the cases wherein the craze has a curved shape within the range in which the effects of the present invention are available.

Furthermore, from the viewpoint of facilitation in forming the craze, it is preferable that the lengthwise direction of the craze is approximately parallel to the TD direction of the craze film (approximately perpendicular to the MD direction). In this case, as an example is illustrated in FIG. 5, the craze does not have to be formed in a straight line from one end of the craze film 1 to the other end opposed to the one end.

The distance P between adjacent crazes may be constant or at random. For example, in the example illustrated in FIG. 5, the distance P between the adjacent crazes 2 is not constant but at random. From the viewpoint of acquiring the effects of high viewing angle expansion, it is preferable that the distance between crazes is at random.

The distance P between adjacent crazes is not limited to a particular one but is preferably narrow from the viewpoint of acquiring a good display screen quality. More specifically, such a distance P is preferably 50 μm or less, more preferably 40 μm or less, and further more preferably 30 μm or less. When distances P are at random, it is preferable that the maximum value of the distances P of the craze film is preferably less than the upper limits.

The craze of the craze film refers to an approximately linear crack formed in the film. The craze usually has a fibril formed in such a crack and a void serving as a hole to be formed in between fibrils. The fibril refers to a fiber that is obtained by molecules constituting the resin being turned into the fiber.

Figure 6:
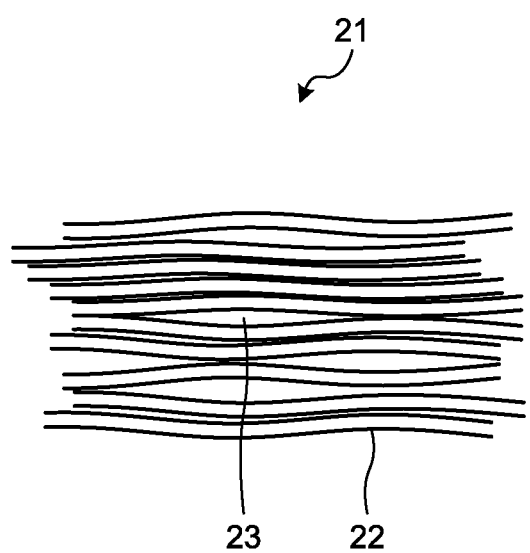
FIG. 6 is an enlarged schematic view illustrating an example of a craze structure.

FIG. 6 is an enlarged schematic view illustrating an example of a craze structure. In FIG. 6, the craze 21 has a large number of elongated fibrils 22 and voids 23 existing therebetween. The fibril 22 usually exists extending in a direction approximately orthogonal to the lengthwise direction of the craze. The craze having such a structure may be formed by performing craze processing of a film. By performing craze processing of the film to apply pressure to the film for forming cracks in the film and turning the molecules constituting the resin into a fiber in the gap of the crack, fibrils and voids therebetween can be formed. The craze processing will be discussed in more detail later.

The diameter of the fibril is usually 5 nm to 50 nm, and preferably 10 nm to 40 nm. The diameter of the void in the craze is usually 5 nm to 45 nm, and preferably 10 nm to 30 nm.

In the present application, when the viewing angle expansion film has a hole-containing portion, the width of such a hole-containing portion is preferably 20 nm or more, more preferably 30 nm or more, and further more preferably 200 nm or more, and is preferably 1000 nm or less, and more preferably 800 nm or less. When the hole-containing portion is a craze, it is preferable that the width of such a craze falls within the aforementioned ranges. The values such as the diameter of the fibril, the diameter of the void, the width of the hole-containing portion, and the width of the craze are an average value. More specifically, the values may be determined by using a scanning electron microscope to observe randomly selected three portions in a region having a hole-containing portion such as a region in which a craze has appeared and measure the size of a hole-containing portion such as a craze and the size of a fibril and a void.

Usually, from the viewpoint of improving the production efficiency, the film having a hole-containing portion is produced as a long-length film. The long-length film having a hole-containing portion may be cut in a desired shape, thereby producing a sheet-shaped film having a hole-containing portion.

The film having a hole-containing portion may be a substantially optically isotropic film having a low optical anisotropy or may also be an optically anisotropic film.

In the liquid crystal display device A, the film having a hole-containing portion such as the craze film is preferably an optically anisotropic film. When the film having a hole-containing portion is an optically anisotropic film, the in-plane retardation Re thereof is preferably 360 nm or less, more preferably 330 nm or less, and further more preferably 300 nm or less. The lower limit is not limited to a particular one but preferably 10 nm or more, more preferably 20 nm or more, and further more preferably 30 nm or more. Furthermore, the thickness-direction retardation Rth is preferably 400 nm or less, more preferably 350 nm or less, and further more preferably 300 nm or less. The lower limit is not limited to a particular one but preferably 10 nm or more, more preferably 20 nm or more, and further more preferably 30 nm or more. In the present application, when the view expansion film is a film having a hole-containing portion such as the craze film, the optical anisotropy thereof such as the retardation may be a value at a position where no hole-containing portion exists.

The total light transmittance of the film having a hole-containing portion is preferably 70% or more, and more preferably 80% or more. The light transmittance may be measured in accordance with JIS K0115 using a spectrophotometer (UV-Visible/NIR spectrophotometer "V-570" manufactured by JASCO Corporation).

2.4.2. Method for Producing Craze Film

The craze film may be produced by any method such as a known method. For example, after a film to be served for craze formation is produced, a craze may be formed on a surface of the film, thereby producing the craze film. In the present application, such a film to be served for craze formation may be simply referred to as a "material film".

2.4.2a. Production of Material Film

Examples of methods for producing material films may include an injection molding method, an extrusion method, a press molding method, an inflation molding method, a blow molding method, a calendar molding method, a cast molding method, and a compression molding method.

Conditions such as the temperature of molten resin for producing material films may be appropriately changed depending on the type of the material films, and the production may be performed in accordance with publicly known conditions.

For a material film including two or more resin layers, examples of methods for producing the material film may include a co-extrusion T die method, a co-extrusion inflation method, a co-extrusion lamination method, a dry lamination, a co-casting method, and a coating molding method.

The material film may be an unstretched film that has not been stretched or may be a stretched film that has been stretched. From the viewpoint of readily forming a desired craze, a stretched film is preferable. The stretching method to be adopted may be either a uniaxial stretching or a biaxial stretching. However, a uniaxial stretching is preferable. In particular, a preferred embodiment is the uniaxial stretching in the TD direction of a material film.

The stretching may be performed using a publicly known stretching device. Examples of the stretching device may include a longitudinal uniaxial stretching device, a tenter stretching device, a bubble stretching device, and a roller stretching device.

The stretching temperature is preferably (TG−30° C.) or higher, and more preferably (TG−10° C.) or higher, and is preferably (TG+60° C.) or lower, and more preferably (TG+50° C.) or lower. As used herein, the term "TG" refers to the glass transition temperature of a resin.

The stretching ratio is preferably 1.2 times to 5 times, more preferably 1.5 times to 4 times, and further more preferably 2 times to 3 times. For stretching in a plurality of different directions as the biaxial stretching, it is preferable that the total stretching ratio expressed by the product of the stretching ratios in respective stretching directions falls within the aforementioned ranges.

2.4.2b. Formation of Craze

After the material film is produced, a craze may be formed on a surface of the material film, thereby producing a craze film.

Examples of specific methods for forming a craze may include a craze processing. By performing the craze processing, the craze film can be efficiently produced.

The craze processing may be performed by any method such as a known method. Examples of the craze processing may include methods disclosed in Japanese Patent Application Laid-Open No. Hei. 6-82607 A, Japanese Patent Application Laid-Open No. Hei. 7-146403 A, Japanese Patent Application Laid-Open No. Hei. 9-166702 A, Japanese Patent Application Laid-Open No. Hei. 9-281306 A, WO2007/046467, Japanese Patent Application Laid-Open No. 2006-313262 A, Japanese Patent Application Laid-Open No. 2009-298100 A, and Japanese Patent Application Laid-Open No. 2012-167159 A.

Figure 7:
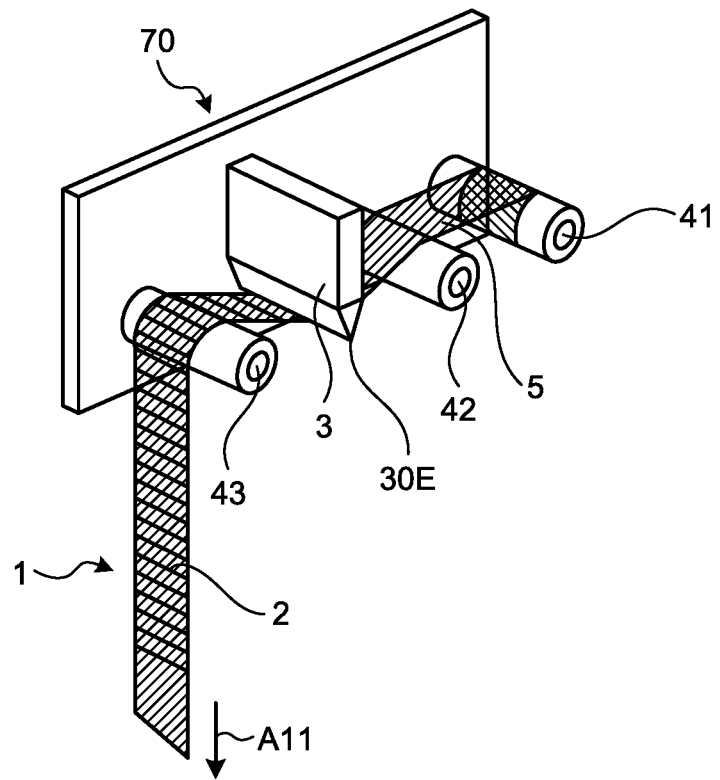
FIG. 7 is a perspective view schematically illustrating an example of a craze processing apparatus.
Figure 8:
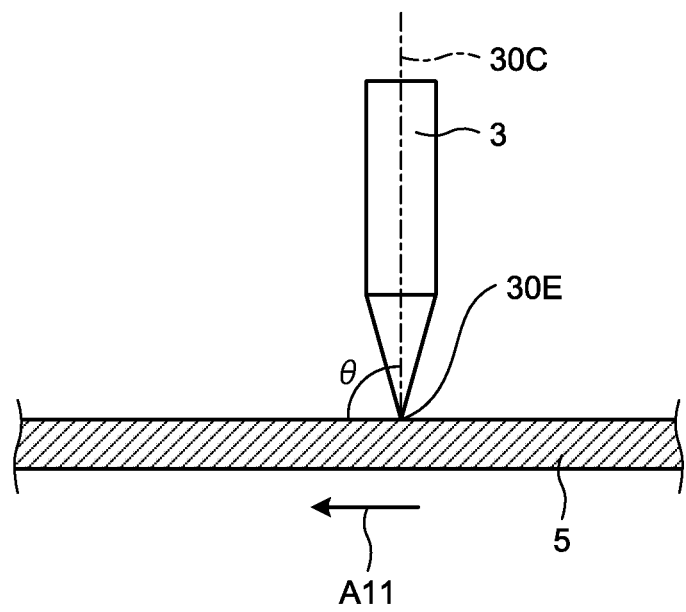
FIG. 8 is a side view schematically illustrating on an enlarged scale the vicinity of a blade of FIG. 7.

With reference to FIG. 7 and FIG. 8, a description will be given of a specific example of the craze processing. FIG. 7 is a perspective view schematically illustrating an example of a craze processing apparatus, and FIG. 8 is an enlarged side view schematically illustrating the vicinity of a blade of FIG. 7. In FIG. 8, the apparatus is observed in the TD direction.

In the example of FIG. 7, a craze processing apparatus 70 includes a dispensing roll 41, conveying rolls 42 and 43, and a blade 3. The blade 3 includes an edge 30E that extends in a direction parallel to the TD direction.

In the operation of the craze processing apparatus 70, a long-length material film 5 conveyed from the dispensing roll 41 in a direction of an arrow A11 is supported and conveyed by the conveying rolls 42 and 43 while being pressed against the edge 30E of the blade 3. This makes it possible to apply a pressure to the material film 5. As a result, a distortion occurs due to the application of pressure on a surface of the material film 5, so that the crazes 2 that extend in a direction approximately parallel to the TD direction are formed. Thus, the craze film 1 can be produced.

In the craze processing, the contacting angle formed by the blade 3 relative to the material film 5 may appropriately be adjusted to an angle by which a desired craze is formed. In the example of FIG. 7 and FIG. 8, the angle is expressed as an angle θ that is formed between the center line 30C of the blade 3 observed in an extending direction of the edge 30E and a surface of the material film 5 in the downstream side. The angle θ is preferably 10° to 60°, more preferably 15° to 50°, and further more preferably 20° to 40°.

When the blade is pushed against the material film, the tension applied to the material film may appropriately be adjusted to the value by which a desired craze is to be formed. The tension is preferably 10 N/m to 300 N/m, and more preferably 50 N/m to 200 N/m.

To perform both the stretching treatment and the craze processing on the material film, the craze processing may be performed before stretching the material film or at the same time as the stretching.

When a film including two or more resin layers is used as the material film and the craze processing is performed on such a film, crazes may occur in all the two or more resin layers or only in some of the resin layers. Furthermore, when crazes occur only in some of the resin layers, the crazes may occur in the outermost surface layer or in an inner layer.

For example, when the craze processing is performed on a material film that is formed of a core layer of a relatively brittle material and skin layers of a relatively soft material on the front and rear surfaces, crazes may occur only in the core layer. Such a multi-layered film may also be used as the craze film. In this case, examples of materials for the core layer may include the aforementioned resin that contains polystyrene, while examples of materials for the skin layer may include an acrylic-based resin. Such a multi-layered film may function as the viewing angle expansion film and simultaneously as a protective film for protecting the polarizer.

Thus, the liquid crystal display device A may be configured in a manner such that such a multi-layered film is provided on the front side of the front side polarizer and the protective film on the front side is omitted. The liquid crystal display device B may be configured in a manner such that such a multi-layered film is provided on the rear side of the front side polarizer and the protective film on the rear side is omitted. Furthermore, by using such a multi-layered film that contains the aforementioned ultraviolet absorber and has an ultraviolet absorption function, it is possible to configure a liquid crystal display device that is thin in thickness and has the durability against ultraviolet rays. In this case, the layer containing the ultraviolet absorber may be the core layer, the skin layer, or both thereof. When the core layer is the layer containing the ultraviolet absorber, the multi-layered film can be readily formed by an extrusion molding and the ultraviolet absorber can be prevented from being volatilized at the time of extrusion molding. As a result, it is possible to readily produce a multi-layered film of high quality.

2.4.3. Disposition of Film Having Hole-Containing Portion

In general, when the liquid crystal display device is operated to gradually increase in brightness from the state of displaying black image to the state of displaying white image, the luminance of the display screen will also gradually increase. For example, when the liquid crystal display device is operated to display 8-bit gray scales on the display screen (displaying black image being 0 and displaying white image being 255, and the levels of gradations are expressed by values from 0 to 255), the display screen will increase in luminance as the scales are increased from 0 to 255. However, depending on the direction of observation, when the liquid crystal display device is operated to gradually increase the brightness, the luminance of the display screen may be decreased to the contrary. Such a discrepancy between the operation of increasing or decreasing the brightness to be displayed on the display device and the actual increase or decrease in luminance of the display screen is referred to as "tone reversal". The tone reversal may be observed at a certain azimuth angle when the display screen of the liquid crystal display device is viewed in an oblique direction.

When the tone reversal takes place and when the tone reversal does not take place, there may occur other problems of narrowing the viewing angle. For example, such a problem as an increase in the value of $\Delta\gamma$ may be raised. $\Delta\gamma$ is the indicator of the difference between a change in brightness when observed in the front direction (at a polar angle of 0°) and a change in brightness when observed in an oblique direction (for example, at a polar angle of 75°). More specifically, in the respective observations in the front and oblique directions, the normalized luminance is determined with the luminance at gray scale 0 being 0% and the luminance at gray scale 255 being 100%. Then, in each gradation in the gray scale, the absolute value of the difference between the normalized luminance in the front direction and the normalized luminance in the direction at a polar angle of 75° is determined, and then the maximum of those values is determined as $\Delta\gamma$ (%).

In a case wherein a film having a hole-containing portion such as the craze film is used as the viewing angle expansion film of the liquid crystal display device, when the azimuth angle at which the tone reversal takes place upon the observation of the display screen in an oblique polar angle direction is set to a perpendicular angle with respect to the lengthwise direction of the hole-containing portion such as a craze, such a tone reversal can be reduced and $\Delta\gamma$ can also be reduced, to thereby expand the viewing angle.

The azimuth angle at which the tone reversal takes place and the azimuth angle at which $\Delta\gamma$ increases are not limited to one direction but may also be two directions or an angle range expanded to a certain extent. In that case, of those directions, the direction in which the most expanded viewing angle is desired may be determined, and then the lengthwise direction of the hole-containing portion may be set in a direction perpendicular to that direction.

As in the example of FIG. 1, in the liquid crystal display device with the VA mode liquid crystal cell, consider the case where a film having a hole-containing portion such as the craze film is provided as the viewing angle expansion film. In this case, it is preferable to dispose the film in a manner such that the lengthwise direction of the hole-containing portion is parallel or perpendicular to, in particular parallel to, the absorption axis of the front side polarizer. When the film having a hole-containing portion is disposed in such a direction, advantageous effects of the viewing angle expansion caused by the hole-containing portion can be achieved at the azimuth angle at which the tone reversal takes place or $\Delta\gamma$ increases.

Although in the example of FIG. 1, only one layer of the viewing angle expansion film is provided, the present invention is not limited thereto, and two or more layers of the viewing angle expansion film may also be provided. For example, when the tone reversal or an increase in $\Delta\gamma$ takes place at two or more azimuth angles, two or more films having a hole-containing portion are deposited and disposed in a manner such that the lengthwise direction of each of the hole-containing portions is perpendicular to each of the azimuth angles at which tone reversal or an increase in $\Delta\gamma$ take place. This makes it possible to expand the viewing angle at each angle.

2.5. Optional Layer Accompanying Viewing Angle Expansion Film

The liquid crystal display device according to the present invention may be provided with the viewing angle expansion film accompanied by an optional layer. For example, the liquid crystal display device A according to the present invention may further include a hard coat layer on the front side surface of the viewing angle expansion film. Inclusion of such a hard coat layer enables the viewing angle expansion film to exhibit the function of protecting the front side polarizer and the function of protecting the display surface of the liquid crystal display device from a mechanical influence from the outside at the time of use of the device. As a result, it is possible to omit a protective film that would be otherwise separately provided to exert those functions, thus reducing the thickness of the device.

The hard coat layer may be formed as a cured product of a polymerizable monomer. Specifically, a liquid composition containing a polymerizable monomer is prepared as a hard coat liquid, and is applied onto a surface of another layer. Then, the polymerizable monomer is polymerized, and as necessary, subjected to a drying process, thereby forming a hard coat layer. The hard coat liquid is preferably a liquid composition containing, as a polymerizable monomer, a compound having three or more (meth)acryloyl groups per molecule in an amount of 50% by weight or more relative to the total amount of the polymerizable monomer. Such a hard coat liquid may be usually cured by the irradiation of active energy rays.

Examples of the compound having three or more (meth) acryloyl groups per molecule may include pentaerythritol tri(meth)acrylate, pentaerythritol tetra(meth)acrylate, dipentaerythritol tetra(meth)acrylate, dipentaerythritol penta(meth)acrylate, and dipentaerythritol hexa(meth)acrylate.

As the compound having three or more (meth)acryloyl groups per molecule, one type thereof may be solely used, and two or more types thereof may also be used in combination at any ratio. For example, a combination of pentaerythritol tri(meth)acrylate and pentaerythritol tetra(meth)acrylate, and a combination of dipentaerythritol tetra(meth)acrylate, dipentaerythritol penta(meth)acrylate, and dipentaerythritol hexa(meth)acrylate may be used.

Among these, a liquid composition containing a compound having four or more (meth)acryloyl groups per molecule in an amount of 60% by weight or more relative to the total amount of the polymerizable monomer is preferably used as the hard coat liquid. Furthermore, a liquid composition containing a compound having four or more (meth) acryloyl groups per molecule, a compound having five or more (meth)acryloyl groups per molecule, and a compound having six or more (meth)acryloyl groups per molecule in an amount of 80% by weight or more relative to the total amount of the polymerizable monomer is particularly preferably used as the hard coat liquid.

Furthermore, for example, the liquid crystal display device according to the present invention may further include an adhesion facilitating layer on a surface of the viewing angle expansion film. The inclusion of such an adhesion facilitating layer makes it possible to improve the adhesion between the viewing angle expansion film and another layer. For example, in the case of the liquid crystal display device A, the device may include the adhesion facilitating layer on the rear side surface of the viewing angle expansion film. The inclusion of such an adhesion facilitating layer makes it possible to improve the adhesion between the front side polarizer and the viewing angle expansion film. Furthermore, in the case of the liquid crystal display device B, the adhesion facilitating layer may be provided on the front side, the rear side, or both sides of the viewing angle expansion film. For example, the provision of the adhesion facilitating layer on the front side of the viewing angle expansion film can improve the adhesion between the viewing angle expansion film and the front side optical film. Furthermore, for example, the provision of the adhesion facilitating layer on the rear surface side of the viewing angle expansion film makes it possible to improve the adhesion between the viewing angle expansion film and the liquid crystal cell.

The adhesion facilitating layer may be formed using a composition X containing a urethane resin. In a preferable aspect, the composition X contains a urethane resin as an aqueous urethane resin. The term "aqueous urethane resin" refers to a urethane resin that may be present in a form of being dispersed in an aqueous medium such as water. The adhesion facilitating layer may be formed by applying the composition X onto a surface of another layer to form a coating film, and performing an operation, such as drying, as necessary to cure the composition X.

Examples of the aqueous urethane resin may include an aqueous urethane resin obtained by reacting (i) a component containing two or more active hydrogens per molecule on average with (ii) a polyvalent isocyanate component; and an aqueous urethane resin produced by performing a urethanizing reaction of the above (i) component and (ii) component in a reaction-inert organic solvent having high hydrophilicity under the condition of containing an excess amount of an isocyanate group to form an isocyanate group-containing prepolymer, then neutralizing the prepolymer, performing a chain extension reaction using a chain extender, and adding water to it to form a dispersion. These aqueous urethane resins may contain an acid component (acid residue). The isocyanate group may be masked by a blocking agent (such as phenols, caprolactams, oximes, active methylenes, and hydrazines). Among these, active methylenes and hydrazines are particularly preferable because of low dissociation temperature of the blocking agent.

Any known method may be appropriately adopted as a chain extension method for the isocyanate group-containing prepolymer. For example, water, a water-soluble polyamine, a glycol, or the like is used as the chain extender, and the isocyanate group-containing prepolymer and the component of the chain extender are reacted in the presence of a catalyst as necessary to thereby extend the prepolymer.

The component containing two or more active hydrogens per molecule on average as the aforementioned (i) component preferably has an active hydrogen of a hydroxyl group. Specific examples of such a compound may include a diol compound, polyether diol, polyester diol, polyether ester diol, polycarbonate diol, and any combinations thereof.

As the polyvalent isocyanate component (ii) to be reacted with the aforementioned (i) component, an aliphatic, alicyclic or aromatic compound containing two or more isocyanate groups per molecule on average may be used.

As more detailed aspects of the aqueous urethane resin component, those described in, for example, Japanese Patent Application Laid-Open No. 2012-073552 A may be appropriately adopted.

A commercially available aqueous urethane resin as it is may be used as the aqueous urethane resin. Examples thereof may include "Adeka Bontighter" series manufactured by Asahi Denka Kogyo K.K., "Olester" series manufactured by Mitsui Toatsu Chemicals, Inc., "Bondic" series and "Hydran" series manufactured by DIC Corporation, "Impranil" series manufactured by Bayer AG, "Soflanate" series manufactured by Japan Soflan, "Poiz" series manufactured by Kao Corporation, "Sanprene" series manufactured by Sanyo Chemical Industries, Ltd., "Aizerax" series manufactured by Hodogaya Chemical Co. Ltd., "SuperFlex" series and "Elastron" series manufactured by DKS Co. Ltd., and "Neorez" series manufactured by Zeneca.

2.6. Viewing Angle And Contrast

By having a configuration as described above, the liquid crystal display device 100 illustrated in FIG. 1 can provide an improved visibility in oblique directions at various azimuth angles and an improved contrast ratio. In particular, the liquid crystal display device 100 can noticeably improve the bright place contrast ratio.

3. Second Embodiment: VA Mode Cell (Second)

Figure 2:
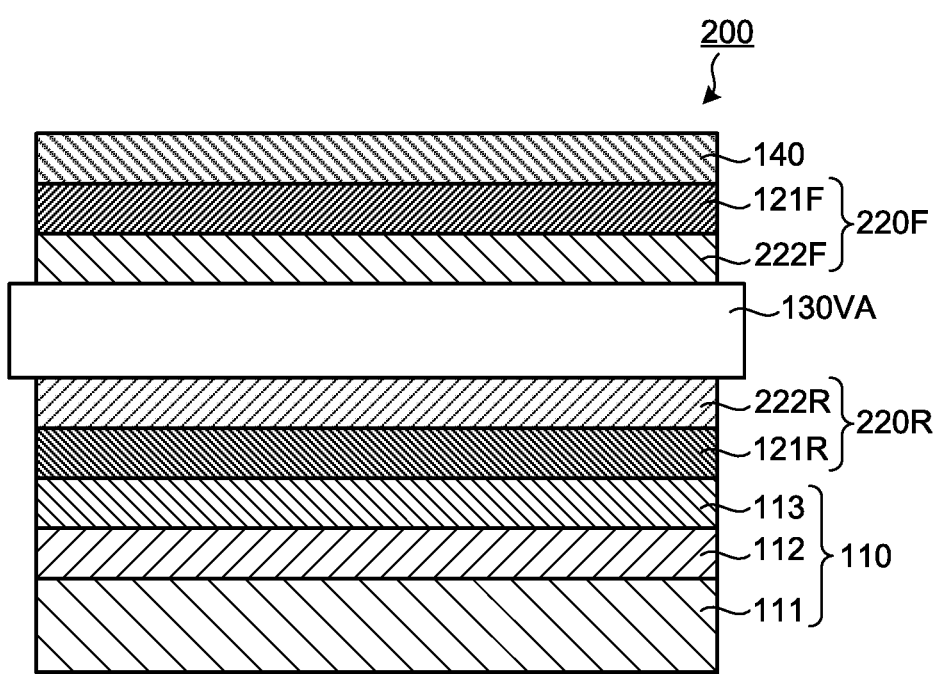
FIG. 2 is a cross-sectional view schematically illustrating another example of the liquid crystal display device according to the present invention.

FIG. 2 is a cross-sectional view schematically illustrating another example of the liquid crystal display device A according to the present invention. In FIG. 2, the liquid crystal display device 200 is different from the liquid crystal display device 100 illustrated in FIG. 1 in that the liquid crystal display device 200 includes a rear side optical film 222R in place of the rear side optical film 122R, and a front side optical film 222F in place of the front side optical film 122F; the rear side polarizer 121R and the rear side optical film 222R constitute a rear side optical layered body 220R; and the front side polarizer 121F and the front side optical film 222F constitute a front side optical layered body 220F. The display device 200 is the same as the display device 100 in the other points. Thus, preferable aspects relating to components other than the rear side optical film 222R and the front side optical film 222F and to optional components are the same as those described with reference to the liquid crystal display device 100 except for the points to be described below.

In the example illustrated in FIG. 2 where the liquid crystal cell 130VA is a linear polarization VA mode cell, it is possible to use a film that satisfies the refractive index relationship of nx≥ny>nz as the rear side optical film 222R and the front side optical film 222F to be provided in combination with such a liquid crystal cell. More specifically, it is possible to adopt a biaxial film which has an in-plane retardation Re of 0 to 120 nm and a thickness-direction retardation Rth of 100 nm to 500 nm. Examples of materials constituting such a film may include the same materials that are exemplified as the examples for the rear side optical film 122R and the front side optical film 122F of the liquid crystal display device 100.

Like the liquid crystal display device 100 illustrated in FIG. 1, the liquid crystal display device 200 illustrated in FIG. 2 can provide an improved visibility in oblique directions at various azimuth angles and an improved contrast ratio. In particular, the liquid crystal display device 200 can noticeably improve the bright place contrast ratio.

4. Third Embodiment: IPS Mode Cell

Figure 3:
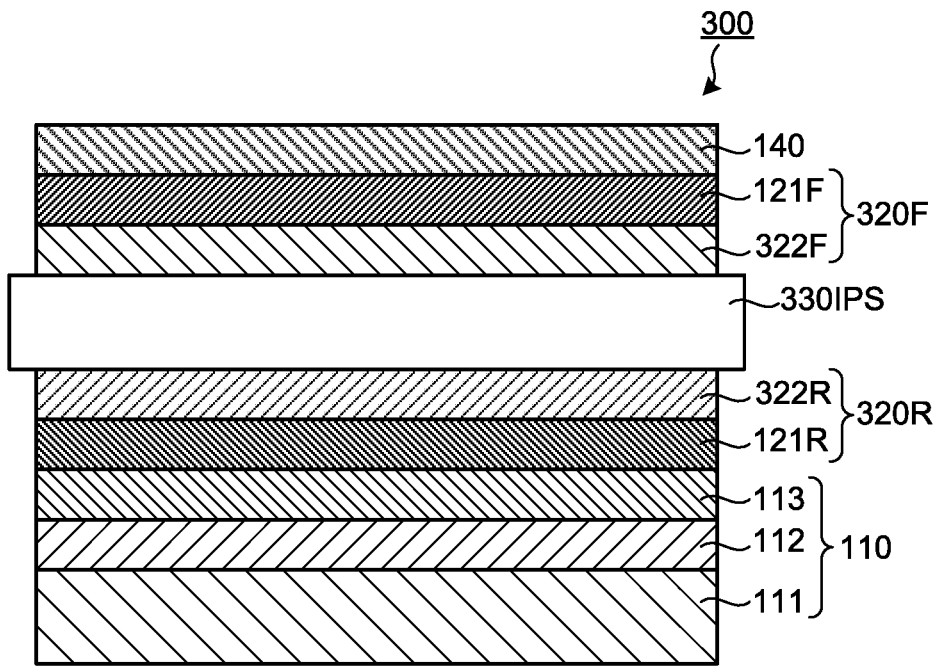
FIG. 3 is a cross-sectional view schematically illustrating still another example of the liquid crystal display device according to the present invention.

FIG. 3 is a cross-sectional view schematically illustrating still another example of the liquid crystal display device A according to the present invention. In FIG. 3, a liquid crystal display device 300 is different from the liquid crystal display device 100 illustrated in FIG. 1 in the following points: the liquid crystal display device 300 includes a rear side optical film 322R in place of the rear side optical film 122R, and a front side optical film 322F in place of the front side optical film 122F; the rear side polarizer 121R and the rear side optical film 322R constitute a rear side optical layered body 320R, and the front side polarizer 121F and the front side optical film 322F constitute a front side optical layered body 320F; and as a liquid crystal cell, the display device 300 includes a liquid crystal cell 330IPS that is an IPS mode cell in place of the liquid crystal cell 130VA that is a VA mode cell. The display device 300 is the same as the display device 100 in the other points. Thus, preferable aspects relating to components other than the liquid crystal cell 330IPS, the rear side optical film 322R, and the front side optical film 322F, and to optional components are the same as those described with reference to the liquid crystal display device 100 except for the points to be described below. The IPS mode liquid crystal cell may adopt any of the normally white mode and the normally black mode but may usually adopt the normally black mode.

4.1. Rear Side Optical Film and Front Side Optical Film

As the rear side optical film 322R and the front side optical film 322F that are provided in combination with the liquid crystal cell 330IPS that is an IPS mode cell, a film that satisfies one or more of nz>nx and nz>ny may be adopted. More preferably, the film may satisfy the requirements of nz>nx, nz>ny, nx≈ny, and nz>(nx+ny)/2, or preferably, the requirement of 0<Nz<1. As used herein, "nx≈ny" encompasses not only the case where nx and ny are exactly the same but also the case where nx and ny are substantially the same. Here, "the case where nx and ny are substantially the same" encompasses that Re is 0 nm to 10 nm, preferably 0 nm to 6 nm, and more preferably 0 nm to 4 nm. Specific examples of such optical films and examples of production methods therefor may include those disclosed in International Publication No. 2006/54695, Japanese Patent Application Laid-Open No. 2005-43740 A, and Japanese Patent Application Laid-Open No. 2006-235085 A.

Of preferable films as the rear side optical film 322R and the front side optical film 322F, examples of those having an optical anisotropy may include a layer containing a material having a negative intrinsic birefringence, a layer containing discotic liquid crystal molecules or lyotropic liquid crystal molecules, and a layer containing an isomerizing substance. Specific examples of these may include, for example, those disclosed in International Publication No. 2006/035635. Furthermore, other specific examples of materials having a negative intrinsic birefringence may include, for example, those disclosed in Japanese Patent Application Laid-Open No. 2011-076026 A.

Of preferable films as the rear side optical film 322R and the front side optical film 322F, further examples of those having an optical anisotropy may include a multi-layered film including an A layer formed of a material having a positive intrinsic birefringence value and a B layer formed of a material having a negative intrinsic birefringence value. Examples of such materials may include those disclosed in Japanese Patent Application Laid-Open No. 2009-223163 A.

Other preferable examples as the rear side optical film 322R and the front side optical film 322F may include an optical element substantially having an optical isotropy. By using such an optical element in combination with the IPS mode cell, it is possible to achieve a wide viewing angle and a high contrast ratio.

Specific examples of such optical elements may include an optical element that satisfies equations (1) and (2) shown below. In the descriptions below, this optical element may be referred to as a "first optical element".

$$Re \leq 10 \text{ nm} \tag{1}$$

$$|Rth| \leq 10 \text{ nm} \tag{2}$$

The Re of the first optical element is preferably 0 nm to 10 nm, more preferably 0 nm to 6 nm, particularly preferably 0 nm to 4 nm, and the most preferably 0 nm to 2 nm. When the Re of the first optical element is within the aforementioned ranges, it is possible to provide a liquid crystal display device which has a reduced amount of light leakage in an oblique direction and is capable of displaying clear images.

The absolute value of Rth of the first optical element (|Rth|) is preferably 10 nm or less, more preferably 8 nm or less, particularly preferably 6 nm or less, and the most preferably 4 nm or less. When the absolute value of Rth of the first optical element is within the aforementioned ranges, it is possible to provide a liquid crystal display device which has a reduced amount of light leakage in an oblique direction and is capable of displaying clear images.

Although the first optical element substantially has an optical isotropy, the slow axis may be detected in practical range. In such a case, for providing a wide viewing angle and high contrast ratio, the first optical element is preferably disposed so that the slow axis thereof is parallel or orthogonal to, in particular parallel to, the absorption axis of an adjacent polarizer.

The first optical element may be a monolayer film substantially having an optical isotropy or may also be a layered body that is constituted of two or more phase difference films. From the viewpoint of display uniformity and thickness, a monolayer film is preferable. When the first optical element is a layered body constituted of two or more phase difference films, Re and Rth of each of the phase difference films may be set so that the total of Re and Rth of each phase difference film is equal to Re and Rth of the first optical element. For example, the first optical element may be obtained by stacking two phase difference films, one having an Re of 10 nm and Rth of 60 nm and the other having an Re of 10 nm and Rth of −60 nm, so that the slow axes are orthogonal to each other. By disposing two phase difference films so that the slow axes are orthogonal to each other, the Re of an optical element can be reduced.

The entire thickness of the first optical element may be different depending on the configuration thereof but is preferably 10 μm to 200 μm, more preferably 20 μm to 200 μm, particularly preferably 30 μm to 150 μm, and the most preferably 30 μm to 100 μm. When the entire thickness is within the ranges mentioned above, it is possible to provide an optical element that has an excellent optical uniformity.

When the first optical element is a monolayer film substantially having an optical isotropy, the film may be a thermoplastic resin film. The thermoplastic resin may be an amorphous polymer or crystalline polymer. The amorphous polymer has an advantage of excellent transparency, and the crystalline polymer has an advantage of excellent rigidity, strength, and chemical resistance. The thermoplastic resin film may or may not be stretched.

Examples of the thermoplastic resin described above may include general-purpose plastics, such as an acrylic resin, a polyolefin resin, a cycloolefin resin, a polyvinyl chloride-based resin, a cellulose-based resin, a styrene-based resin, an acrylonitrile-butadiene-styrene-based resin, an acrylonitrile-styrene-based resin, poly(methyl methacrylate), polyvinyl acetate, and a poly(vinylidene chloride)-based resin; general-purpose engineering plastics, such as a polyamide-based resin, a polyacetal-based resin, a polycarbonate-based resin, a modified polyphenylene ether-based resin, a polybutylene terephthalate-based resin, and a polyethylene terephthalate-based resin; and super engineering plastics, such as a polyphenylene sulfide-based resin, a polysulfone-based resin, a polyether sulfone-based resin, a polyether ether ketone-based resin, a polyarylate-based resin, a liquid crystal resin, a polyamideimide-based resin, a polyimide-based resin, and a polytetrafluoroethylene-based resin. As the thermoplastic resin, one type thereof may be solely used, and two or more types thereof may also be used in combination at any ratio. The aforementioned thermoplastic resin may be used after being subjected to an optional appropriate polymer modification. Examples of the polymer modification may include copolymerization, cross-linking, modification of the molecular end, and modification of tacticity.

When the first optical element is a layered body that is constituted of two or more phase difference films, the first optical element preferably includes a first phase difference film that satisfies equations (3) and (4) shown below and a second phase difference film that satisfies equations (5) and (6) shown below.

$$Re \leq 10 \text{ nm} \tag{3}$$

$$10 \text{ nm} < Rth \leq 200 \text{ nm} \tag{4}$$

$$Re \leq 10 \text{ nm} \tag{5, and}$$

$$-200 \text{ nm} \leq Rth < -10 \text{ nm} \tag{6}$$

The first phase difference film preferably has substantially an optically negative uniaxial property, and ideally an optical axis in a normal direction. It is preferable for the first phase difference film to have a refractive index distribution that satisfies $nx \approx ny > nz$.

The Rth of the first phase difference film is preferably more than 10 nm and 200 nm or less, more preferably 20 nm to 150 nm, and particularly preferably 40 nm to 120 nm. When the Rth of the first phase difference film is within the aforementioned ranges, it is possible to provide a phase difference film that has an excellent optical uniformity.

The first phase difference film may be formed from an appropriate optional material. Examples of the first phase difference film may include a polymer film containing a cellulose-based resin described in paragraphs [0049] to [0063] of Japanese Patent Application Laid-Open No. 2005-097621 A, a polymer film containing a polyimide-based resin described in paragraph [0100] of Japanese Patent Application Laid-Open No. 2003-287750 A, a solidified layer and/or a cured layer of a composition containing a liquid crystal compound oriented in a cholesteric alignment described in paragraph [0123] of Japanese Patent Application Laid-Open No. 2003-287623 A, a solidified layer and/or a cured layer of a composition containing a discotic liquid crystal compound described in paragraph [0068] of Japanese Patent Application Laid-Open No. Hei. 7-281028 A, and a solidified layer of a water swellable inorganic laminar compound described in paragraph [0034] of Japanese Patent Application Laid-Open No. Hei. 9-80233 A.

The second phase difference film preferably has substantially an optically positive uniaxial property, and ideally an optical axis in a normal direction. It is preferable for the second phase difference film to have a refractive index distribution that satisfies $nz > nx \approx ny$.

The Rth of the second phase difference film is preferably −200 nm or more and less than −10 nm, more preferably −150 nm to −20 nm, and particularly preferably −120 nm to −40 nm. When the Rth of the second phase difference film is within the aforementioned ranges, it is possible to provide a phase difference film that has an excellent optical uniformity.

The second phase difference film may be formed from an appropriate optional material. Examples of the second phase difference film may include a solidified layer or a cured layer of a composition containing a liquid crystal compound oriented in a homeotropic alignment described in Example 1 of Japanese Patent Application Laid-Open No. 2002-174725 A and Example 1 of Japanese Patent Application Laid-Open No. 2003-149441 A, a biaxially stretched film of a polymer film having a negative intrinsic birefringence described in TOSOH Research & Technical Review, Vol. 48 (published in 2004), and a polymer film containing a cellulose-based resin having a negative Rth value described in paragraphs [0074] to [0091] in Japanese Patent Application Laid-Open No. 2005-120352 A. The second phase difference film is preferably a solidified layer or a cured layer of a composition containing a liquid crystal compound oriented in a homeotropic alignment because a second phase difference film having a small thickness and excellent in optical uniformity can therewith be obtained.

4.2. Disposition of Film Having Hole-Containing Portion Such as Craze Film

As in the example of FIG. 3, consider the case where the IPS mode cell is used as the liquid crystal cell, and as the viewing angle expansion film of the liquid crystal display device, a film having a hole-containing portion such as the craze film is used. In this case, like the case where the VA mode cell is used as the liquid crystal cell, when the azimuth angle at which the tone reversal takes place or $\Delta\gamma$ increases upon the observation of the display screen in an oblique polar angle direction is set to a perpendicular angle with respect to the lengthwise direction of the hole-containing portion such as a craze, such a tone reversal can be reduced and increase in $\Delta\gamma$ can be reduced, to thereby expand the viewing angle. The azimuth angle at which the tone reversal takes place or $\Delta\gamma$ increases is not limited to one direction but may also be two directions or an angle range expanded to a certain extent. In that case, of those directions, the direction in which the most expanded viewing angle is desired may be determined, and then the lengthwise direction of the hole-containing portion may be set in a direction perpendicular to that direction.

As in the example of FIG. 3, in the liquid crystal display device with the IPS mode liquid crystal cell, consider the case where a film having a hole-containing portion such as the craze film is provided as the viewing angle expansion film. In this case, like the liquid crystal display device with the VA mode liquid crystal cell, it is preferable to dispose the film in a manner such that the lengthwise direction of the hole-containing portion such as the craze is parallel or perpendicular to, in particular parallel to, the absorption axis of the front side polarizer. When the film having a hole-containing portion is disposed in such a direction, advantageous effects of the viewing angle expansion caused by the hole-containing portion can be achieved at the azimuth angle at which the tone reversal takes place or $\Delta\gamma$ increases.

By having a configuration as described above, the liquid crystal display device 300 illustrated in FIG. 3 can provide an improved visibility in oblique directions at various azimuth angles and an improved contrast ratio. In particular, the liquid crystal display device 300 can noticeably improve the dark place contrast ratio.

5. Fourth Embodiment: TN Mode Cell

Figure 4:
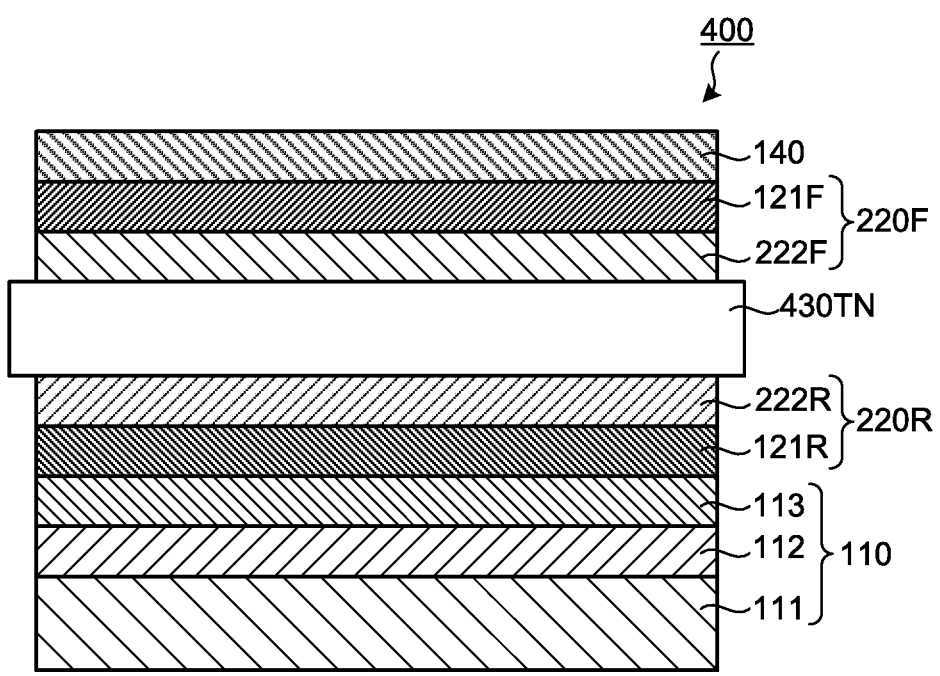
FIG. 4 is a cross-sectional view schematically illustrating still another example of the liquid crystal display device according to the present invention.

FIG. 4 is a cross-sectional view schematically illustrating another example of the liquid crystal display device A according to the present invention. In FIG. 4, a liquid crystal display device 400 is different from the liquid crystal display device 200 illustrated in FIG. 2 in that it includes, as the liquid crystal cell, a liquid crystal cell 430TN that is a TN mode cell in place of the liquid crystal cell 130VA that is a VA mode cell. The display device 400 is the same as the display device 200 in the other points. Thus, preferable aspects relating to components other than the liquid crystal cell 430TN and to optional components are the same as those described with reference to the liquid crystal display device 200 except for the points to be described below.

The TN mode liquid crystal cell may adopt any of the normally white mode and the normally black mode but may usually adopt the normally white mode.

In the liquid crystal display device 400, the absorption axis directions of the rear side polarizer 121R and the front side polarizer 121F may appropriately be set to a direction by which the function of the display device can be exhibited. Unlike the cases of including the VA mode liquid crystal cell and including the IPS mode liquid crystal cell, in the case where the display surface has a rectangular shape in the liquid crystal display device 400 including the TN mode liquid crystal cell, the absorption axis of the rear side polarizer or the front side polarizer is usually in a direction of about 45° or about 135° relative to one edge of the display surface. Furthermore, the rear side polarizer 121R and the front side polarizer 121F are usually disposed so that the mutual absorption axes are orthogonal to each other when observed in a normal direction.

As in the example of FIG. 4, consider the case where the TN mode cell is used as the liquid crystal cell, and as the viewing angle expansion film of the liquid crystal display device, a film having a hole-containing portion such as the craze film is used. In such a case, like the case where the VA mode cell is used as the liquid crystal cell, when the azimuth angle at which the tone reversal takes place or $\Delta\gamma$ increases upon the observation of the display screen in an oblique polar angle direction is set to a perpendicular angle with respect to the lengthwise direction of the hole-containing portion such as a craze, such a tone reversal or increase in $\Delta\gamma$ can be reduced, to thereby expand the viewing angle. The azimuth angle at which the tone reversal takes place or $\Delta\gamma$ increases is not limited to one direction but may also be two directions or an angle range expanded to a certain extent. In that case, of those directions, the direction in which the most expanded viewing angle is desired may be determined, and then the lengthwise direction of the hole-containing portion may be set in a direction perpendicular to that direction.

In an ordinary TN mode liquid crystal display device (which has a rectangular display screen and is used with the display screen kept upright in an approximately vertical direction, the long edge direction of the rectangle is directed in the horizontal direction and the short edge direction is directed in an approximately vertical direction), the tone reversal or increase in $\Delta\gamma$ is often found when observed from below. Thus, as in the example of FIG. 4, when a film having a hole-containing portion is provided as the viewing angle expansion film in a liquid crystal display device including the TN mode liquid crystal cell, it is preferable that the film is disposed in a manner such that the angle formed by the lengthwise direction of the hole-containing portion and the horizontal direction of the display screen is parallel. When the film having a hole-containing portion is disposed in such a direction, advantageous effects of the viewing angle expansion caused by the hole-containing portion can be achieved at the azimuth angle at which the tone reversal takes place or $\Delta\gamma$ increases.

Like the liquid crystal display device 100 illustrated in FIG. 1, the liquid crystal display device 400 illustrated in FIG. 4 can provide an improved visibility in oblique directions at various azimuth angles and an improved contrast ratio.

6. Fifth Embodiment: VA Mode Cell (Third)

Figure 9:
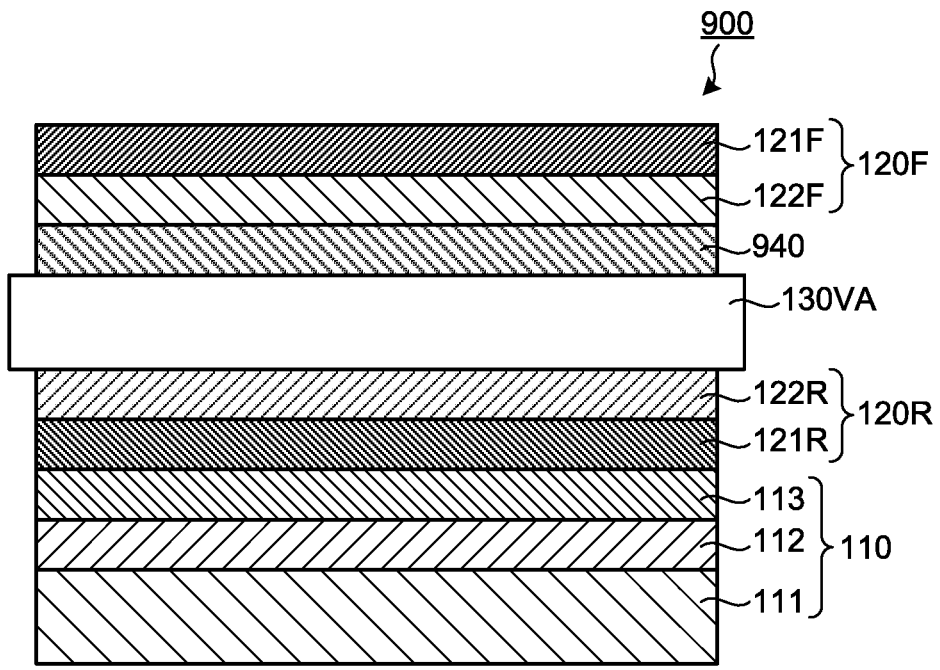
FIG. 9 is a cross-sectional view schematically illustrating still another example of the liquid crystal display device according to the present invention.

FIG. 9 is a cross-sectional view schematically illustrating an example of the liquid crystal display device B according to the present invention. In FIG. 9, the liquid crystal display device 900 includes, sequentially in the following order, the light source 111, the rear side polarizer 121R, the liquid crystal cell 130VA, a viewing angle expansion film 940, and the front side polarizer 121F. In this example, the liquid crystal cell 130VA is a VA mode liquid crystal cell. The VA mode liquid crystal cell may adopt any of the normally white mode and the normally black mode but may usually adopt the normally black mode.

The liquid crystal display device 900 further includes, as optional components, the rear side optical film 122R provided between the rear side polarizer 121R and the liquid crystal cell 130VA, and the front side optical film 122F provided between the front side polarizer 121F and the viewing angle expansion film 940. In this example, the rear side polarizer 121R and the rear side optical film 122R constitute the rear side circularly polarizing plate 120R, while the front side polarizer 121F and the front side optical film 122F constitute the front side circularly polarizing plate 120F.

In the liquid crystal display device B according to the present invention, the viewing angle expansion film is provided between the liquid crystal cell and the front side polarizer. The viewing angle expansion film allows light having entered from the rear side to be emitted from the front side in a more diffused state. In the example of FIG. 9, the viewing angle expansion film emits light, which has been emitted from the liquid crystal cell, in a more diffused state from the front side.

In the liquid crystal display device B according to the present invention, the viewing angle expansion film is preferably isotropic. More specifically, it is preferable that the in-plane retardation Re of the viewing angle expansion film is such that Re≤5 nm, and the thickness-direction retardation Rth is such that |Rth|≤10 nm. The viewing angle expansion film being isotropic can reduce decreases in luminance and unevenness in color when the display surface is observed in an oblique direction.

In the liquid crystal display device B according to the present invention, the viewing angle expansion film is preferably unstretched. Here, the unstretched film refers to those that have not been subjected to stretching at the ratio of greater than 1.05 times before the film is put to use as the viewing angle expansion film after having been formed in the shape of film. Furthermore, the viewing angle expansion film is preferably a film formed by an extrusion molding method. By adopting such a forming method, it is possible to readily provide the viewing angle expansion film having the aforementioned isotropy.

In the liquid crystal display device B according to the present invention, the viewing angle expansion film is provided between the liquid crystal cell and the front side polarizer, thereby allowing the viewing angle expansion film to be disposed closer to the liquid crystal cell. This leads to effects of providing clearer images, for example. More specifically, when the viewing angle expansion film is disposed at a position farther from the liquid crystal cell, such as the position toward the front side than the front side polarizer, emitted light is diffused at a position farther from the liquid crystal cell, thereby possibly making an image unclear with blurring added to the image. In contrast to this, in the liquid crystal display device according to the present invention, since the viewing angle expansion film is disposed at a position closer to the liquid crystal cell, emitted light is diffused at a position closer to the liquid crystal cell, thereby making it possible to reduce blurring added to the image and thus provide a clearer image. In addition, as a preferable aspect, adoption of the viewing angle expansion film having the aforementioned isotropy makes it possible to achieve the effects of providing clearer images and simultaneously the effects of providing improved luminance and reducing unevenness in color when observed in an oblique direction.

Like the liquid crystal display device A, preferable examples of the viewing angle expansion film in the liquid crystal display device B according to the present invention may include a film having a hole-containing portion such as the craze film. However, as a method for producing a material film to be served for use in the craze film production, of various types of production methods mentioned above, it is the most preferable to adopt an extrusion molding method from the viewpoint of acquiring an isotropic craze film. The material film may be an unstretched film that has not been stretched or may be a stretched film that has been stretched. However, from the viewpoint of acquiring an isotropic craze film, the material film is preferably the unstretched film that has not been stretched.

The other features and advantages of the liquid crystal display device 900 may be the same as those of the liquid crystal display device 100 described as the first embodiment.

7. Sixth Embodiment: VA Mode Cell (Fourth)

Figure 10:
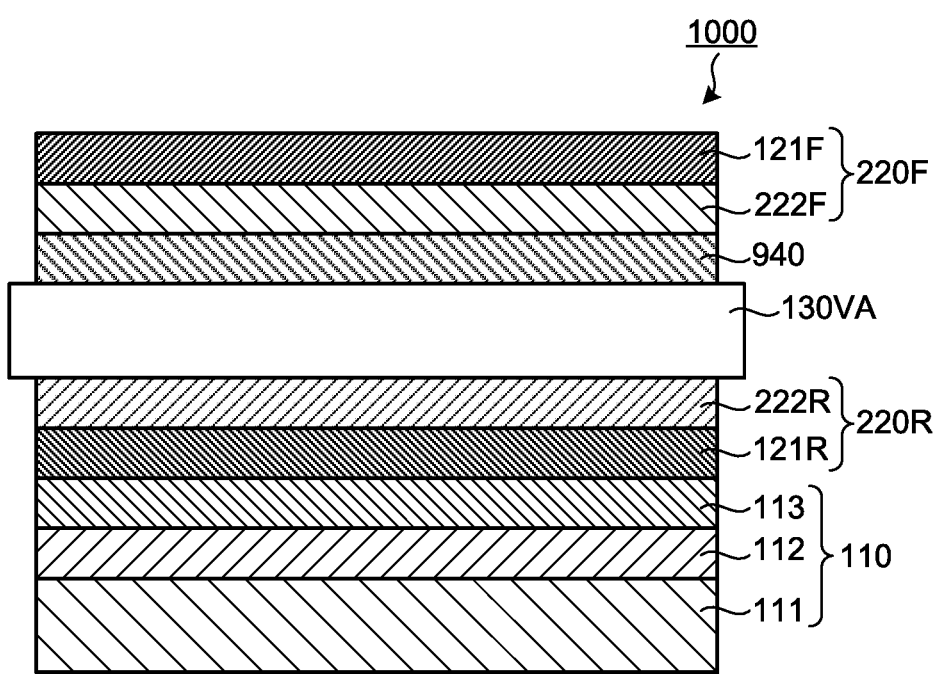
FIG. 10 is a cross-sectional view schematically illustrating still another example of the liquid crystal display device according to the present invention.

FIG. 10 is a cross-sectional view schematically illustrating another example of the liquid crystal display device B according to the present invention. In FIG. 10, a liquid crystal display device 1000 is different from the liquid crystal display device 900 illustrated in FIG. 9 in the following points: the liquid crystal display device 1000 includes the rear side optical film 222R in place of the rear side optical film 122R, and the front side optical film 222F in place of the front side optical film 122F; the rear side polarizer 121R and the rear side optical film 222R constitute the rear side optical layered body 220R, and the front side polarizer 121F and the front side optical film 222F constitute the front side optical layered body 220F. The display device 1000 is the same as the display device 900 in the other points. Thus, preferable aspects relating to components other than the rear side optical film 222R and the front side optical film 222F, and to optional components are the same as those described with reference to the liquid crystal display device 900 except for the points to be described below.

In the example illustrated in FIG. 10 where the liquid crystal cell 130VA is a linear polarization VA mode cell, it is possible to adopt a film that satisfies the refractive index relationship of nx≥ny>nz as the rear side optical film 222R and the front side optical film 222F to be provided in combination with such a liquid crystal cell. More specifically, it is possible to adopt a biaxial film which has an in-plane retardation Re of 0 to 120 nm, and a thickness-direction retardation Rth of 100 nm to 500 nm Examples of materials constituting such a film may include the same materials that are exemplified in the examples for the rear side optical film 122R and the front side optical film 122F of the liquid crystal display device 100.

Like the liquid crystal display device 900 illustrated in FIG. 9, the liquid crystal display device 1000 illustrated in FIG. 10 can provide an improved visibility in oblique directions at various azimuth angles and an improved contrast ratio. In particular, the liquid crystal display device 1000 can noticeably improve the bright place contrast ratio.

8. Seventh Embodiment: IPS Mode Cell

Figure 11:
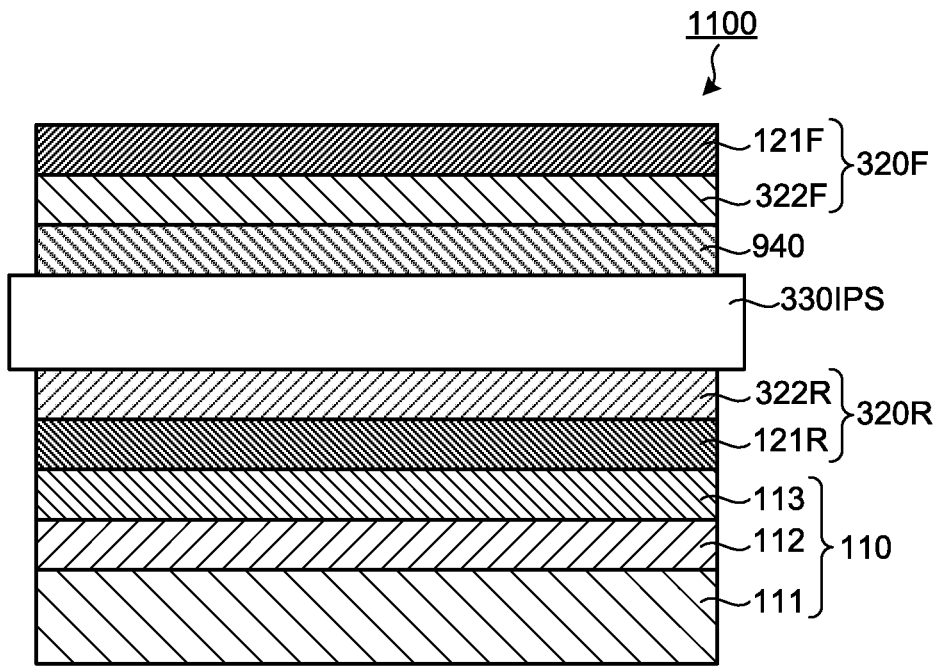
FIG. 11 is a cross-sectional view schematically illustrating still another example of the liquid crystal display device according to the present invention.

FIG. 11 is a cross-sectional view schematically illustrating still another example of the liquid crystal display device B according to the present invention. In FIG. 11, the liquid crystal display device 1100 is different from the liquid crystal display device 900 illustrated in FIG. 9 in the following points: the liquid crystal display device 1100 includes the rear side optical film 322R in place of the rear side optical film 122R, and the front side optical film 322F in place of the front side optical film 122F; the rear side polarizer 121R and the rear side optical film 322R constitute the rear side optical layered body 320R, and the front side polarizer 121F and the front side optical film 322F constitute the front side optical layered body 320F; and as a liquid crystal cell, the display device 1100 includes the liquid crystal cell 330IPS that is an IPS mode cell in place of the liquid crystal cell 130VA that is a VA mode cell. The display device 1100 is the same as the display device 900 in the other points. Thus, preferable aspects relating to components other than the liquid crystal cell 330IPS, the rear side optical film 322R, and the front side optical film 322F and to optional components are the same as those described with reference to the liquid crystal display device 900 except for the points to be described below.

In the liquid crystal display device illustrated in FIG. 11, the features and advantages of the rear side optical film and the front side optical film may be the same as those of the liquid crystal display device 300 described as the third embodiment. In the embodiment illustrated in FIG. 11, the liquid crystal display device 1100 of the IPS mode has both the front side optical film 322F and the rear side optical film 322R. However, the present invention is not limited thereto, and either one or both of the optical films may also be omitted. For example, the front side optical film 322F may be omitted to bring the viewing angle expansion film 940 into direct contact with the front side polarizer 121F, thereby allowing the viewing angle expansion film 940 to function simultaneously as a protective film for protecting the front side polarizer 121F. The display device having such a configuration can be in a simplified structure with reduced thickness while enjoying an advantage such as a wide viewing angle provided by the IPS mode.

In the liquid crystal display device illustrated in FIG. 11, the features and advantages of disposing the film having a hole-containing portion such as the craze film may be the same as those of the liquid crystal display device 300 described as the third embodiment.

9. Eighth Embodiment: TN Mode Cell

Figure 12:
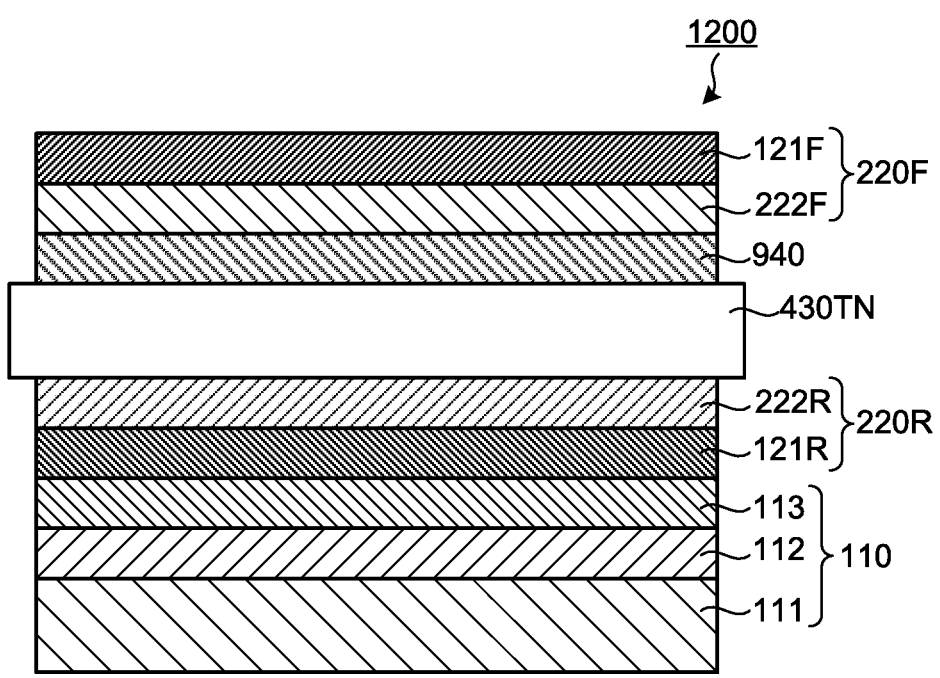
FIG. 12 is a cross-sectional view schematically illustrating still another example of the liquid crystal display device according to the present invention.

FIG. 12 is a cross-sectional view schematically illustrating another example of the liquid crystal display device B according to the present invention. In FIG. 12, the liquid crystal display device 1200 is different from the liquid crystal display device 1000 illustrated in FIG. 10 in including, as a liquid crystal cell, the liquid crystal cell 430TN that is a TN mode cell in place of the liquid crystal cell 130VA that is a VA mode cell. The display device 1200 is the same as the display device 1000 in the other points. Thus, preferable aspects relating to components other than the liquid crystal cell 430TN and to optional components are the same as those described with reference to the liquid crystal display device 1000 except for the points to be described below.

The TN mode liquid crystal cell may adopt any of the normally white mode and the normally black mode, but usually adopt the normally white mode.

In the liquid crystal display device 1200, the absorption axis directions of the rear side polarizer 121R and the front side polarizer 121F may appropriately be set to a direction by which the function of the display device can be exhibited. Unlike the case of including the VA mode liquid crystal cell and the IPS mode liquid crystal cell, when the display surface has a rectangular shape in the liquid crystal display device 1200 that is provided with a TN mode liquid crystal cell, the absorption axis of the rear side polarizer or the front side polarizer is usually in a direction of about 45° or about 135° relative to one edge of the display surface. Furthermore, the rear side polarizer 121R and the front side polarizer 121F are usually disposed so that the mutual absorption axes are orthogonal to each other when observed in the normal direction.

As in the example of FIG. 12, consider the case where the TN mode cell is used as the liquid crystal cell, and as the viewing angle expansion film of the liquid crystal display device, a film having a hole-containing portion such as the craze film is used. In such a case, like the case where the VA mode cell is used as the liquid crystal cell, when the azimuth angle at which the tone reversal takes place or $\Delta\gamma$ increases upon the observation of the display screen in an oblique polar angle direction is set to a perpendicular angle with respect to the lengthwise direction of the hole-containing portion such as a craze, such a tone reversal or increase in $\Delta\gamma$ can be reduced, to thereby expand the viewing angle. The azimuth angle at which the tone reversal takes place or $\Delta\gamma$ increases is not limited to one direction but may also be two directions or an angle range expanded to a certain extent. In that case, of those directions, the direction in which the most expanded viewing angle is desired may be determined, and then the lengthwise direction of the hole-containing portion may be set in a direction perpendicular to that direction.

In an ordinary TN mode liquid crystal display device (which has a rectangular display screen and is used with the display screen kept upright in an approximately vertical direction, the long edge direction of the rectangle is directed in the horizontal direction, and the short edge direction is directed in an approximately vertical direction), the tone reversal or increase in $\Delta\gamma$ is often found when observed from below. Thus, as in the example of FIG. 12, when a film having a hole-containing portion such as the craze film is provided as the viewing angle expansion film in a liquid crystal display device including the TN mode liquid crystal cell, it is preferable that the film is disposed in a manner such that the angle formed by the lengthwise direction of the hole-containing portion such as the craze and the horizontal direction of the display screen is parallel. When the film having a hole-containing portion is disposed in such a direction, advantageous effects of the viewing angle expansion caused by the hole-containing portion can be achieved at the azimuth angle at which the tone reversal takes place or $\Delta\gamma$ increases.

Like the liquid crystal display device 900 illustrated in FIG. 9, the liquid crystal display device 1200 illustrated in FIG. 12 can provide an improved visibility in oblique directions at various azimuth angles and an improved contrast ratio.

EXAMPLES

Hereinafter, the present invention will be specifically described by illustrating Examples. However, the present invention is not limited to the following Examples. The present invention may be implemented with any modifications without departing from the scope of claims of the present invention and its equivalents. Unless otherwise stated, "%" and "part" that represent an amount in the following description are on the basis of weight.

[Evaluation Methods]

[White Luminance, Contrast Ratio, and Δγ]

The white luminance, contrast ratio, and Δγ of the liquid crystal display devices obtained in Examples and Comparative Examples were measured. For the measurements, a spectroradiometer (product name "SR-LEDW" manufactured by TOPCON CORPORATION) was used to perform measurements at various polar angles. The white luminance and the contrast ratio were measured in the front direction (at a polar angle of 0°) of the display devices. For the measurements, the illuminance of light with which the display surface of the device is irradiated was 0 lux. The luminance upon displaying white image was determined as the white luminance (unit: $cd/m^2$). Furthermore, the ratio of (luminance upon displaying white image)/(luminance upon displaying black image) was determined as the contrast ratio.

Furthermore, tones at each gradation from 0 (black) to 255 (white) in the gray scale of 256 gradations were displayed to observe luminance in the front direction and in a direction at a polar angle of 75°. The azimuth angle in the direction at the polar angle of 75° was set to an in-plane direction of the display device that was perpendicular to the lengthwise direction of the hole-containing portion in Examples, and in Comparative Example, was set to the in-plane direction of the display device corresponding to each Example. In the observation in each direction, the normalized luminance was calculated with the luminance at gray scale 0 being 0% and the luminance at gray scale 255 being 100%, and the relationship between the gray scale and the normalized luminance was determined. At each gradation of the gray scale, the absolute value of the difference between the normalized luminance in the front direction and the normalized luminance in the direction at the polar angle of 75° was determined, and of those values, the maximum one was obtained as Δγ (%).

Production Example 1

Using the apparatus schematically illustrated in FIG. 7 and FIG. 8, a viewing angle expansion film was produced.

An unstretched polypropylene film having a width of 300 mm and a thickness of 15 μm (manufactured by Futamura Chemical Co., Ltd.) and a biaxially stretched polypropylene film having a thickness of 40 μm (manufactured by Futamura Chemical Co., Ltd.) were bonded to each other by a thermal laminating method to obtain a material film 5.

The material film 5 was disposed so that the unstretched polypropylene film side thereof was brought into contact with a SUS blade 3 (with a blade edge R=0.3 mm), and the material film 5 was pushed against the blade 3 and conveyed with the tension of the film at 100 N/m and at a speed of 50 mm/min in the direction of an arrow A11 to be thereby perform craze processing.

Upon performing craze processing, the edge 30E of the blade 3 was directed in the width direction (the TD direction) of the material film. The angle θ that was formed between the center line 30C of the blade 3 when observed in the direction of extension of the edge 30E and the surface of the material film 5 in the downstream side was set to 20°. In this manner, a viewing angle expansion film was produced.

The hole-containing portions of the resulting viewing angle expansion film appeared on the biaxially stretched polypropylene film side. The hole-containing portions thereof were approximately linear crazes, while the lengthwise directions of the hole-containing portions were approximately parallel to each other and approximately parallel to the TD direction of the film. The intervals P between the hole-containing portions were random intervals of 30 μm or less. The average of the widths of the individual hole-containing portions was 350 nm, the average of the depths of the hole-containing portions was 15 μm, and the average of the diameters of the fibrils was 30 nm. These values were determined by randomly selecting three points of the craze film and then observing a 25 μm-square area with the scanning electron microscope.

Production Example 2

(P2-1. Co-Extrusion Molding of Multi-Layered Film)

As a material film, a multi-layered film that had a two-type, three-layered structure of skin layer/core layer/skin layer was molded. For the molding, a film molding apparatus for co-extrusion molding was used. As the material for the skin layer, an acrylic resin ("HT55X" manufactured by Sumitomo Chemical Company, glass transition temperature 108° C.) containing an acrylic polymer and rubber particles was used. As the material of the core layer, a styrene-maleic anhydride copolymer resin ("Dylark D332" manufactured by Nova Chemicals, glass transition temperature 128° C.) was used.

The resulting multi-layered film was 300 mm in width, 15 μm in the thickness of each skin layer, and 20 μm in the thickness of the core layer. (Total thickness: 50 μm)

(P2-2. Production of Viewing Angle Expansion Film)

Using the apparatus schematically illustrated in FIG. 7 and FIG. 8, a viewing angle expansion film was produced.

As the material film 5, the multi-layered film obtained in (P2-1) was used. The material film 5 was disposed in contact with the SUS blade 3 (the blade edge R=0.3 mm), and the material film 5 was pushed against the blade 3 to perform craze processing while being conveyed at a speed of 50 mm/min in the direction of the arrow A11 with the tension of the material film at 100 N/m.

Upon craze processing, the edge 30E of the blade 3 was directed in the width direction of the material film (in the TD direction). The angle θ that was formed between the center line 30C of the blade 3 when observed in the direction of extension of the edge 30E and the surface of the material film 5 in the downstream side was set to 20°. In this manner, a viewing angle expansion film was produced.

The hole-containing portions of the resulting viewing angle expansion film appeared in the core layer. The hole-containing portions thereof were approximately linear crazes, while the lengthwise directions of the hole-containing portions were approximately parallel to each other and approximately parallel to the TD direction of the film. The intervals P between the hole-containing portions were random intervals of 1 μm or less. The average of the widths of the individual hole-containing portions was 50 nm, the average of the depths of the hole-containing portions was 20 μm, and the average of the diameters of the fibrils was 5 nm. These values were determined by randomly selecting three

Production Example 3

The viewing angle expansion film obtained in Production Example 2 was further subjected to stretching treatment. The stretching temperature was set to 120° C., the stretching direction was set to the MD direction, and the stretching ratio was set to 1.5 times. In this manner, a stretched viewing angle expansion film was obtained.

The resulting viewing angle expansion film had hole-containing portions maintained in the core layer. The hole-containing portions thereof were approximately linear crazes, and the lengthwise directions of the hole-containing portions were approximately parallel to each other and approximately parallel to the TD direction of the film. The intervals P between the hole-containing portions were random intervals of 1.5 μm or less. The average of the widths of the individual hole-containing portions was 120 nm, the average of the depths of the hole-containing portions was 12 μm, and the average of the diameters of the fibrils was 4 nm. These values were determined by randomly selecting three points of the craze film and then observing a 25 μm-square area with the scanning electron microscope.

Example A1-1

The viewing angle expansion film obtained in Production Example 1 was bonded to a polarizing plate on the viewing side surface of the liquid crystal display device of the circular polarization VA mode. Upon bonding, orientations of them were adjusted so that the absorption axis of the polarizer on the viewing side polarizing plate formed an angle of 90° relative to the lengthwise direction of the hole-containing portion of the viewing angle expansion film, and the lengthwise direction of the hole-containing portion was parallel to the short edge direction of the rectangular display screen. Furthermore, the bonding of the viewing angle expansion film was performed so that the surface on the side on which the hole-containing portion was formed was on the side to be viewed. In this manner, a liquid crystal display device according to the present invention was obtained.

The resulting liquid crystal display device had the configuration of the liquid crystal display device 100 schematically illustrated in FIG. 1. That is, the liquid crystal display device 100 according to this Example had, sequentially in the following order:
- the light source unit 110 including the light source 111, the luminance enhancement film 112, and the collimating film 113;
- the rear side circularly polarizing plate 120R including the rear side polarizer 121R and the rear side optical film 122R;
- the normally black VA mode liquid crystal cell 130VA;
- the front side circularly polarizing plate 120F including the front side optical film 122F and the front side polarizer 121F; and
- the viewing angle expansion film 140.

The white luminance, contrast ratio, and Δγ of the resulting liquid crystal display device were measured.

Example A1-2

A liquid crystal display device was obtained and the white luminance, contrast ratio, and Δγ thereof were measured in the same manner as that in Example A1-1 except for the following change point.

The viewing angle expansion film obtained in Production Example 2 was used in place of the viewing angle expansion film obtained in Production Example 1.

Example A1-3

A liquid crystal display device was obtained and the white luminance, contrast ratio, and Δγ thereof were measured in the same manner as that in Example A1-1 except for the following change point.

The stretched viewing angle expansion film obtained in Production Example 3 was used in place of the viewing angle expansion film obtained in Production Example 1.

Comparative Example 1

The white luminance, contrast ratio, and Δγ of the circular polarization VA mode liquid crystal display device that was the same as the device itself utilized in Examples A1-1 to A1-3 were measured.

Example A2-1

The viewing angle expansion film obtained in Production Example 1 was bonded to the polarizing plate on the viewing side surface of the linear polarization VA mode liquid crystal display device (manufactured by BenQ, 27 inches, type GW2760HS). Upon bonding, orientations of them were adjusted so that the absorption axis of the polarizer on the viewing side polarizing plate formed an angle of 90° relative to the lengthwise direction of the hole-containing portion of the viewing angle expansion film, and the lengthwise direction of the hole-containing portion was parallel to the short edge direction of the rectangular display screen. Furthermore, the bonding of the viewing angle expansion film was performed so that the surface on the side on which the hole-containing portion was formed was the side to be viewed. In this manner, a liquid crystal display device according to the present invention was obtained.

The resulting liquid crystal display device had the configuration of the liquid crystal display device 200 schematically illustrated in FIG. 2. That is, the liquid crystal display device 200 according to this Example had, sequentially in the following order:
- the light source unit 110 including the light source 111, the luminance enhancement film 112, and the collimating film 113;
- the rear side circularly polarizing plate 220R including the rear side polarizer 121R and the rear side optical film 222R;
- the normally black VA mode liquid crystal cell 130VA;
- the front side circularly polarizing plate 220F including the front side optical film 222F and the front side polarizer 121F; and
- the viewing angle expansion film 140.

The white luminance, contrast ratio, and Δγ of the resulting liquid crystal display device were measured.

Example A2-2

A liquid crystal display device was obtained and the white luminance, contrast ratio, and Δγ thereof were measured in the same manner as that in Example A2-1 except for the following change point.

The viewing angle expansion film obtained in

Production Example 2 was used in place of the viewing angle expansion film obtained in Production Example 1.

Example A2-3

A liquid crystal display device was obtained and the white luminance, contrast ratio, and Δγ thereof were measured in the same manner as that in Example A2-1 except for the following change point.

The stretched viewing angle expansion film obtained in Production Example 3 was used in place of the viewing angle expansion film obtained in Production Example 1.

Comparative Example 2

The white luminance, contrast ratio, and Δγ of the linear polarization VA mode liquid crystal display device that was the same as the device itself utilized in Examples A2-1 to A2-3 were measured.

Example A3-1

The viewing angle expansion film obtained in Production Example 1 was bonded to the polarizing plate on the viewing side surface of the IPS mode liquid crystal display device (manufactured by LG, 23 inches, type 23MP47HQ-P). Upon bonding, orientations of them were adjusted so that the absorption axis of the polarizer on the viewing side polarizing plate formed an angle of 90° relative to the lengthwise direction of the hole-containing portion of the viewing angle expansion film, and the lengthwise direction of the hole-containing portion was parallel to the short edge direction of the rectangular display screen. Furthermore, the bonding of the viewing angle expansion film was performed so that the surface on the side on which the hole-containing portion was formed was the side to be viewed. In this manner, a liquid crystal display device according to the present invention was obtained.

The resulting liquid crystal display device had the configuration of the liquid crystal display device 300 schematically illustrated in FIG. 3. That is, the liquid crystal display device 300 according to this Example had, sequentially in the following order:

- the light source unit 110 including the light source 111, the luminance enhancement film 112, and the collimating film 113;
- the rear side circularly polarizing plate 320R including the rear side polarizer 121R and the rear side optical film 322R;
- the IPS mode liquid crystal cell 330IPS;
- the front side circularly polarizing plate 320F including the front side optical film 322F and the front side polarizer 121F; and
- the viewing angle expansion film 140.

The white luminance, contrast ratio, and Δγ of the resulting liquid crystal display device were measured.

Example A3-2

A liquid crystal display device was obtained and the white luminance, contrast ratio, and Δγ thereof were measured in the same manner as that in Example A3-1 except for the following change point.

The viewing angle expansion film obtained in Production Example 2 was used in place of the viewing angle expansion film obtained in Production Example 1.

Example A3-3

A liquid crystal display device was obtained and the white luminance, contrast ratio, and Δγ thereof were measured in the same manner as that in Example A3-1 except for the following change point.

The stretched viewing angle expansion film obtained in Production Example 3 was used in place of the viewing angle expansion film obtained in Production Example 1.

Comparative Example 3

The white luminance, contrast ratio, and Δγ of the IPS mode liquid crystal display device that was the same as the device itself utilized in Examples A3-1 to A3-3 were measured.

Example A4-1

The viewing angle expansion film obtained in Production Example 1 was bonded to the polarizing plate on the viewing side surface of the TN mode liquid crystal display device (manufactured by BenQ, 19.5 inches, type GL2023A). Upon bonding, orientations of them were adjusted so that the absorption axis of the polarizer on the viewing side polarizing plate formed an angle of 45° relative to the lengthwise direction of the hole-containing portion of the viewing angle expansion film, and the lengthwise direction of the hole-containing portion was parallel to the long edge direction of the rectangular display screen. Furthermore, the bonding of the viewing angle expansion film was performed so that the surface on the side on which the hole-containing portion was formed was the side to be viewed. In this manner, a liquid crystal display device according to the present invention was obtained.

The resulting liquid crystal display device had the configuration of the liquid crystal display device 400 schematically illustrated in FIG. 4. That is, the liquid crystal display device 400 according to this Example had, sequentially in the following order:

- the light source unit 110 including the light source 111, the luminance enhancement film 112, and the collimating film 113;
- the rear side circularly polarizing plate 220R including the rear side polarizer 121R and the rear side optical film 222R;
- the TN mode liquid crystal cell 430TN;
- the front side circularly polarizing plate 220F including the front side optical film 222F and the front side polarizer 121F; and
- the viewing angle expansion film 140.

The white luminance, contrast ratio, and Δγ of the resulting liquid crystal display device were measured.

Example A4-2

A liquid crystal display device was obtained and the white luminance, contrast ratio, and Δγ thereof were measured in the same manner as that in Example A4-1 except for the following change point.

The viewing angle expansion film obtained in Production Example 2 was used in place of the viewing angle expansion film obtained in Production Example 1.

Example A4-3

A liquid crystal display device was obtained and the white luminance, contrast ratio, and Δγ thereof were measured in the same manner as that in Example A4-1 except for the following change point.

The stretched viewing angle expansion film obtained in Production Example 3 was used in place of the viewing angle expansion film obtained in Production Example 1.

Comparative Example 4

The white luminance, contrast ratio, and Δγ of the TN mode liquid crystal display device that was the same as the device itself utilized in Examples A4-1 to A4-3 were measured.

Example B1-1

From the circular polarization VA mode liquid crystal display device (the same one as that used in Examples A1-1 to A1-3), the front side circularly polarizing plate including the front side optical film and the front side polarizer was peeled off to expose the front side surface of the liquid crystal cell. The viewing angle expansion film obtained in Production Example 1 was bonded to the front side surface of the liquid crystal cell. Upon bonding, orientations of them were adjusted so that the absorption axis of the polarizer on the viewing side polarizing plate formed an angle of 90° relative to the lengthwise direction of the hole-containing portion of the viewing angle expansion film, and the lengthwise direction of the hole-containing portion was parallel to the short edge direction of the rectangular display screen. Furthermore, the bonding of the viewing angle expansion film was performed so that the surface on the side on which the hole-containing portion was formed was the side to be viewed.

Furthermore, the peeled-off front side circularly polarizing plate was bonded to the viewing angle expansion film. The orientation of bonding was set to be the same as that before the peeling-off. In this manner, a liquid crystal display device according to the present invention was obtained.

The resulting liquid crystal display device had the configuration of the liquid crystal display device 900 schematically illustrated in FIG. 9. That is, the liquid crystal display device 900 according to this Example had, sequentially in the following order:

the light source unit 110 including the light source 111, the luminance enhancement film 112, and the collimating film 113;

the rear side circularly polarizing plate 120R including the rear side polarizer 121R and the rear side optical film 122R;

the normally black VA mode liquid crystal cell 130VA;

the viewing angle expansion film 940; and the front side circularly polarizing plate 120F including the front side optical film 122F and the front side polarizer 121F.

The white luminance, contrast ratio, and Δγ of the resulting liquid crystal display device were measured.

Example B1-2

A liquid crystal display device was obtained and the white luminance, contrast ratio, and Δγ thereof were measured in the same manner as that in Example B1-1 except for the following change point.

The viewing angle expansion film obtained in Production Example 2 was used in place of the viewing angle expansion film obtained in Production Example 1.

Example B1-3

A liquid crystal display device was obtained and the white luminance, contrast ratio, and Δγ thereof were measured in the same manner as that in Example B1-1 except for the following change point.

The stretched viewing angle expansion film obtained in Production Example 3 was used in place of the viewing angle expansion film obtained in Production Example 1.

Example B2-1

From the linear polarization VA mode liquid crystal display device (the same one as that used in Examples A2-1 to A2-3), the front side circularly polarizing plate including the front side optical film and the front side polarizer was peeled off to expose the front side surface of the liquid crystal cell. The viewing angle expansion film obtained in Production Example 1 was bonded to the front side surface of the liquid crystal cell. Upon bonding, orientations of them were adjusted so that the absorption axis of the polarizer on the viewing side polarizing plate formed an angle of 90° relative to the lengthwise direction of the hole-containing portion of the viewing angle expansion film, and the lengthwise direction of the hole-containing portion was parallel to the short edge direction of the rectangular display screen. Furthermore, the bonding of the viewing angle expansion film was performed so that the surface on the side on which the hole-containing portion was formed was the side to be viewed.

Furthermore, the peeled-off front side circularly polarizing plate was bonded to the viewing angle expansion film. The orientation of bonding was set to be the same as that before the peeling-off. In this manner, a liquid crystal display device according to the present invention was obtained.

The resulting liquid crystal display device had the configuration of the liquid crystal display device 1000 schematically illustrated in FIG. 10. That is, the liquid crystal display device 1000 according to this Example had, sequentially in the following order:

the light source unit 110 including the light source 111, the luminance enhancement film 112, and the collimating film 113;

the rear side circularly polarizing plate 220R including the rear side polarizer 121R and the rear side optical film 222R;

the normally black VA mode liquid crystal cell 130VA;

the viewing angle expansion film 940; and the front side circularly polarizing plate 220F including the front side optical film 222F and the front side polarizer 121F.

The white luminance, contrast ratio, and $\Delta\gamma$ of the resulting liquid crystal display device were measured.

Example B2-2

A liquid crystal display device was obtained and the white luminance, contrast ratio, and $\Delta\gamma$ thereof were measured in the same manner as that in Example B2-1 except for the following change point.

The viewing angle expansion film obtained in Production Example 2 was used in place of the viewing angle expansion film obtained in Production Example 1.

Example B2-3

A liquid crystal display device was obtained and the white luminance, contrast ratio, and $\Delta\gamma$ thereof were measured in the same manner as that in Example B2-1 except for the following change point.

The stretched viewing angle expansion film obtained in Production Example 3 was used in place of the viewing angle expansion film obtained in Production Example 1.

Example B3-1

From the IPS mode liquid crystal display device (the same one as that used in Examples A3-1 to A3-3), the front side circularly polarizing plate including the front side optical film and the front side polarizer was peeled off to expose the front side surface of the liquid crystal cell. The viewing angle expansion film obtained in Production Example 1 was bonded to the front side surface of the liquid crystal cell. Upon bonding, orientations of them were adjusted so that the absorption axis of the polarizer on the viewing side polarizing plate formed an angle of 90° relative to the lengthwise direction of the hole-containing portion of the viewing angle expansion film, and the lengthwise direction of the hole-containing portion was parallel to the short edge direction of the rectangular display screen. Furthermore, the bonding of the viewing angle expansion film was performed so that the surface on the side on which the hole-containing portion was formed was the side to be viewed.

Furthermore, the peeled-off front side circularly polarizing plate was bonded to the viewing angle expansion film. The orientation of bonding was set to be the same as that before the peeling-off. In this manner, a liquid crystal display device according to the present invention was obtained.

The resulting liquid crystal display device had the configuration of the liquid crystal display device 1100 schematically illustrated in FIG. 11. That is, the liquid crystal display device 1100 according to this Example had, sequentially in the following order:

the light source unit 110 including the light source 111, the luminance enhancement film 112, and the collimating film 113;

the rear side circularly polarizing plate 320R including the rear side polarizer 121R and the rear side optical film 322R;

the IPS mode liquid crystal cell 330IPS;

the viewing angle expansion film 940; and the front side circularly polarizing plate 320F including the front side optical film 322F and the front side polarizer 121F.

The white luminance, contrast ratio, and $\Delta\gamma$ of the resulting liquid crystal display device were measured.

Example B3-2

A liquid crystal display device was obtained and the white luminance, contrast ratio, and $\Delta\gamma$ thereof were measured in the same manner as that in Example B3-1 except for the following change point.

The viewing angle expansion film obtained in Production Example 2 was used in place of the viewing angle expansion film obtained in Production Example 1.

Example B3-3

A liquid crystal display device was obtained and the white luminance, contrast ratio, and $\Delta\gamma$ thereof were measured in the same manner as that in Example B3-1 except for the following change point.

The stretched viewing angle expansion film obtained in Production Example 3 was used in place of the viewing angle expansion film obtained in Production Example 1.

Example B4-1

From the TN mode liquid crystal display device (the same one as that used in Examples A4-1 to A4-3), the front side circularly polarizing plate including the front side optical film and the front side polarizer was peeled off to expose the front side surface of the liquid crystal cell. The viewing angle expansion film obtained in Production Example 1 was bonded to the front side surface of the liquid crystal cell. Upon bonding, orientations of them were adjusted so that the absorption axis of the polarizer on the viewing side polarizing plate formed an angle of 45° relative to the lengthwise direction of the hole-containing portion of the viewing angle expansion film, and the lengthwise direction of the hole-containing portion was parallel to the long edge direction of the rectangular display screen. Furthermore, the bonding of the viewing angle expansion film was performed so that the surface on the side on which the hole-containing portion was formed was the side to be viewed.

Furthermore, the peeled-off front side circularly polarizing plate was bonded to the viewing angle expansion film. The orientation of bonding was set to be the same as that before the peeling-off. In this manner, a liquid crystal display device according to the present invention was obtained.

The resulting liquid crystal display device had the configuration of the liquid crystal display device 1200 schematically illustrated in FIG. 12. That is, the liquid crystal display device 1200 according to this Example had, sequentially in the following order:

the light source unit 110 including the light source 111, the luminance enhancement film 112, and the collimating film 113;

the rear side circularly polarizing plate 220R including the rear side polarizer 121R and the rear side optical film 222R;

the TN mode liquid crystal cell 430TN;

the viewing angle expansion film 940; and the front side circularly polarizing plate 220F including the front side optical film 222F and the front side polarizer 121F.

The white luminance, contrast ratio, and $\Delta\gamma$ of the resulting liquid crystal display device were measured.

Example B4-2

A liquid crystal display device was obtained and the white luminance, contrast ratio, and $\Delta\gamma$ thereof were measured in the same manner as that in Example B4-1 except for the following change point.

The viewing angle expansion film obtained in Production Example 2 was used in place of the viewing angle expansion film obtained in Production Example 1.

Example B4-3

A liquid crystal display device was obtained and the white luminance, contrast ratio, and $\Delta\gamma$ thereof were measured in the same manner as that in Example B4-1 except for the following change point.

The stretched viewing angle expansion film obtained in Production Example 3 was used in place of the viewing angle expansion film obtained in Production Example 1.

The results of Examples and Comparative Examples are shown in Table 1 and Table 2.

TABLE 1

| | Contrast | White luminance (cd/m$^2$) | $\Delta\gamma$ (%) |
|---|---|---|---|
| Ex. A1-1 | 2400 | 330 | 19 |
| Ex. A1-2 | 2750 | 340 | 28 |
| Ex. A1-3 | 1650 | 320 | 13 |
| Comp. Ex. 1 | 3000 | 360 | 32 |
| Ex. A2-1 | 2350 | 275 | 18.5 |
| Ex. A2-2 | 2700 | 290 | 27 |
| Ex. A2-3 | 1600 | 265 | 12 |
| Comp. Ex. 2 | 3000 | 300 | 32 |
| Ex. A3-1 | 960 | 240 | 9 |
| Ex. A3-2 | 1100 | 240 | 13 |
| Ex. A3-3 | 650 | 230 | 5 |
| Comp. Ex. 3 | 1200 | 265 | 14 |
| Ex. A4-1 | 800 | 135 | 55 |
| Ex. A4-2 | 950 | 145 | 65 |
| Ex. A4-3 | 550 | 130 | 45 |
| Comp. Ex. 4 | 1000 | 155 | 70 |

TABLE 2

| | Contrast | White luminance (cd/m$^2$) | $\Delta\gamma$ (%) |
|---|---|---|---|
| Ex. B1-1 | 2280 | 314 | 18 |
| Ex. B1-2 | 2613 | 323 | 27 |
| Ex. B1-3 | 1568 | 304 | 12 |
| Ex. B2-1 | 2233 | 261 | 18 |
| Ex. B2-2 | 2565 | 276 | 26 |
| Ex. B2-3 | 1520 | 252 | 11 |
| Ex. B3-1 | 912 | 228 | 8 |
| Ex. B3-2 | 1045 | 228 | 12 |
| Ex. B3-3 | 618 | 219 | 4 |
| Ex. B4-1 | 760 | 128 | 54 |
| Ex. B4-2 | 903 | 138 | 64 |
| Ex. B4-3 | 523 | 124 | 44 |

As shown in Table 1, in the circular polarization VA mode, Example A1-1, Example A1-2, and Example A1-3 resulted in smaller $\gamma\Delta$ than that of Comparative Example 1. From this fact, it is seen that viewing angles in Example A1-1, Example A1-2, and Example A1-3 are expanded when compared with Comparative Example 1.

As shown in Table 1, in the linear polarization VA mode, Example A2-1, Example A2-2, and Example A2-3 resulted in smaller $\gamma\Delta$ than that of Comparative Example 2. From this fact, it is seen that viewing angles in Example A2-1, Example A2-2, and Example A2-3 are expanded when compared with Comparative Example 2.

As shown in Table 1, in the IPS mode, Example A3-1, Example A3-2, and Example A3-3 resulted in smaller $\gamma\Delta$ than that of Comparative Example 3. From this fact, it is seen that viewing angles in Example A3-1, Example A3-2, and Example A3-3 are expanded when compared with Comparative Example 3.

As shown in Table 1, in the TN mode, Example A4-1, Example A4-2, and Example A4-3 resulted in smaller $\gamma\Delta$ than that of Comparative Example 4. From this fact, it is seen that viewing angles in Example A4-1, Example A4-2, and Example A4-3 are expanded when compared with Comparative Example 4.

As shown in Table 2, in the circular polarization VA mode, Example B1-1, Example B1-2, and Example B1-3 resulted in smaller $\gamma\Delta$ than that of Comparative Example 1. From this fact, it is seen that viewing angles in Example B1-1, Example B1-2, and Example B1-3 are expanded when compared with Comparative Example 1.

As shown in Table 2, in the linear polarization VA mode, Example B2-1, Example B2-2, and Example B2-3 resulted in smaller $\gamma\Delta$ than that of Comparative Example 2. From this fact, it is seen that viewing angles in Example B2-1, Example B2-2, and Example B2-3 are expanded when compared with Comparative Example 2.

As shown in Table 2, in the IPS mode, Example B3-1, Example B3-2, and Example B3-3 resulted in smaller $\gamma\Delta$ than that of Comparative Example 3. From this fact, it is seen that viewing angles in Example B3-1, Example B3-2, and Example B3-3 are expanded when compared with Comparative Example 3.

As shown in Table 2, in the TN mode, Example B4-1, Example B4-2, and Example B4-3 resulted in smaller $\gamma\Delta$ than that of Comparative Example 4. From this fact, it is seen that viewing angles in Example B4-1, Example B4-2, and Example B4-3 are expanded when compared with Comparative Example 4.

REFERENCE SIGN LIST

1: craze film
2: craze
3: blade
5: material film
100: liquid crystal display device
200: liquid crystal display device
21: craze
22: fibril 23: hole
300: liquid crystal display device
400: liquid crystal display device
70: craze processing apparatus
110: light source unit
111: light source
112: luminance enhancement film
113: collimating film
120F: front side circularly polarizing plate
120R: rear side circularly polarizing plate
121F: front side polarizer
121R: rear side polarizer
122F: front side optical film
122R: rear side optical film
130VA: liquid crystal cell
140: viewing angle expansion film
220F: front side optical layered body
220R: rear side optical layered body
222F: front side optical film
222R: rear side optical film
320F: front side optical layered body
320R: rear side optical layered body
322F: front side optical film
322R: rear side optical film
330IPS: liquid crystal cell
430TN: liquid crystal cell
900: liquid crystal display device
940: viewing angle expansion film
1000: liquid crystal display device
1100: liquid crystal display device
1200: liquid crystal display device

The invention claimed is:

1. A liquid crystal display device comprising, sequentially in the following order:
   a light source unit, a rear side polarizer, a liquid crystal cell, a front side polarizer, and
   a viewing angle expansion film, wherein
   the liquid crystal cell is a VA mode liquid crystal cell,
   the viewing angle expansion film has a hole-containing portion, and
   a lengthwise direction of the hole-containing portion is parallel or perpendicular to the absorption axis of the front side polarizer.

2. The liquid crystal display device according to claim 1, further comprising a hard coat layer on a front side surface of the viewing angle expansion film.

3. The liquid crystal display device according to claim 1, wherein the viewing angle expansion film protects a front side surface of the front side polarizer.

4. The liquid crystal display device according to claim 1, further comprising:
   a rear side optical film provided between the rear side polarizer and the liquid crystal cell; and
   a front side optical film provided between the front side polarizer and the liquid crystal cell, wherein
   the rear side polarizer and the rear side optical film constitute a rear side circularly polarizing plate, and
   the front side polarizer and the front side optical film constitute a front side circularly polarizing plate.

5. The liquid crystal display device according to claim 4, wherein the rear side optical film, the front side optical film, or both thereof are a $\lambda/4$ plate.

6. The liquid crystal display device according to claim 4, wherein an Nz factor of the rear side optical film, of the front side optical film, or of both of these films are such that $Nz \geq 1.3$.

7. The liquid crystal display device according to claim 1, wherein the liquid crystal cell is an IPS mode liquid crystal cell.

8. The liquid crystal display device according to claim 1, including a display surface of a rectangular shape, wherein
   an absorption axis of the rear side polarizer or the front side polarizer is in a direction parallel or perpendicular to one edge of the display surface.

9. The liquid crystal display device according to claim 1, wherein the liquid crystal cell is a TN mode liquid crystal cell.

10. The liquid crystal display device according to claim 9, including a display surface of a rectangular shape, wherein
    an absorption axis of the rear side polarizer or the front side polarizer is in a direction at about 45° or about 135° relative to one edge of the display surface.

11. The liquid crystal display device according to claim 1, wherein the viewing angle expansion film includes, as the hole-containing portion, a plurality of hole-containing portions that are approximately parallel to each other.

12. The liquid crystal display device according to claim 1, wherein the viewing angle expansion film includes two or more resin layers, and the hole-containing portion is provided on one or more of the resin layers.

13. The liquid crystal display device according to claim 1, wherein the viewing angle expansion film is formed of a multi-layered film including a core layer, and has a craze, as the hole-containing portion, in the core layer.

14. The liquid crystal display device according to claim 1, wherein in the viewing angle expansion film, adjacent ones of the hole-containing portions are disposed at random intervals of 50 μm or less, and the hole-containing portion has a width of 20 nm or more.

15. The liquid crystal display device according to claim 1, wherein an azimuth angle at which tone reversal takes place upon observation of a screen of the display device in an oblique polar angle direction is a perpendicular angle with respect to the lengthwise direction of the hole-containing portion.

* * * * *